(12) United States Patent
Nomoto et al.

(10) Patent No.: US 7,573,606 B2
(45) Date of Patent: Aug. 11, 2009

(54) DATA PROCESSING APPARATUS, PRINTING APPARATUS, PRINT CONTROL METHOD, STORING MEDIUM STORING COMPUTER-READABLE PROGRAM THEREIN, AND PROGRAM

(75) Inventors: Masakazu Nomoto, Yokohama (JP); Hiroshi Kai, Tokyo (JP); Hideo Natori, Hino (JP); Hideki Honda, Kawasaki (JP); Tsuyoshi Yamamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 878 days.

(21) Appl. No.: 10/924,985

(22) Filed: Aug. 25, 2004

(65) Prior Publication Data

US 2005/0099644 A1    May 12, 2005

(30) Foreign Application Priority Data

Aug. 27, 2003    (JP)    ............... 2003-209011

(51) Int. Cl.
     *G06F 15/00*    (2006.01)
     *G06F 3/12*    (2006.01)
     *G06K 1/00*    (2006.01)
     *G03G 15/041*    (2006.01)

(52) U.S. Cl. .................. 358/1.9; 358/1.1; 358/1.2; 399/196

(58) Field of Classification Search ................. 358/1.1, 358/1.2, 1.9; 399/45, 81, 82, 182, 183, 196; 347/15, 35, 36, 96
See application file for complete search history.

(56) References Cited

U.S. PATENT DOCUMENTS 6,895,192 B2 * 5/2005 Katoh et al. ............... 399/45
6,991,327 B2 * 1/2006 Goto et al. ............... 347/96
7,011,389 B2 * 3/2006 Edamura et al. ............... 347/36
7,061,642 B2    6/2006 Kumagai

FOREIGN PATENT DOCUMENTS

| JP | 2-216587 | | 8/1990 |
|---|---|---|---|
| JP | 5-147304 | | 6/1993 |
| JP | 11316669 A | * | 11/1999 |
| JP | 2000-037915 | | 2/2000 |
| JP | 2002-165085 | | 6/2002 |
| JP | 2003-025563 | | 1/2003 |
| JP | 2003-046763 | | 2/2003 |

OTHER PUBLICATIONS

English translation of JP 2-216587.
English translation of JP 2003-046763.

* cited by examiner

*Primary Examiner*—Edward L Coles
*Assistant Examiner*—Thomas J Lett
(74) *Attorney, Agent, or Firm*—Fitzpatrick, Cella, Harper & Scinto

(57) ABSTRACT

Even if the user selects a print mode for executing borderless printing, when the borderless printing is improper for a discriminated sheet type, in order to prevent the occurrence of various faults in a printing unit due to the execution of whole surface printing onto the sheet on which borderless printing is improper by outputting image information with margins on the sheet, a sense result of a media is obtained and whether or not the media type indicates the media which can be borderless-printed is discriminated on the basis of the sensed result. If it is determined that the media is not the media which can be borderless-printed, the print mode is changed to bordered printing.

12 Claims, 26 Drawing Sheets

SHEET CONVEYING DIRECTION

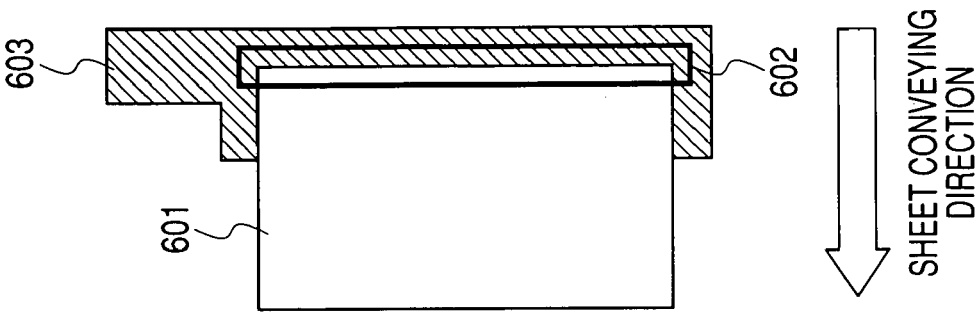
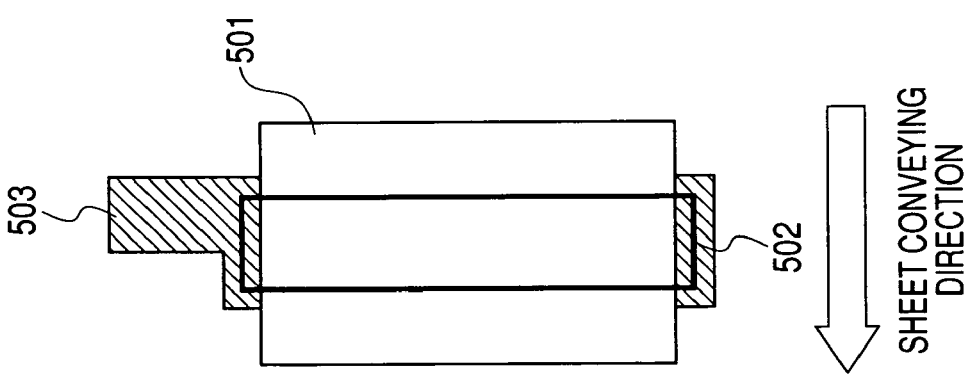
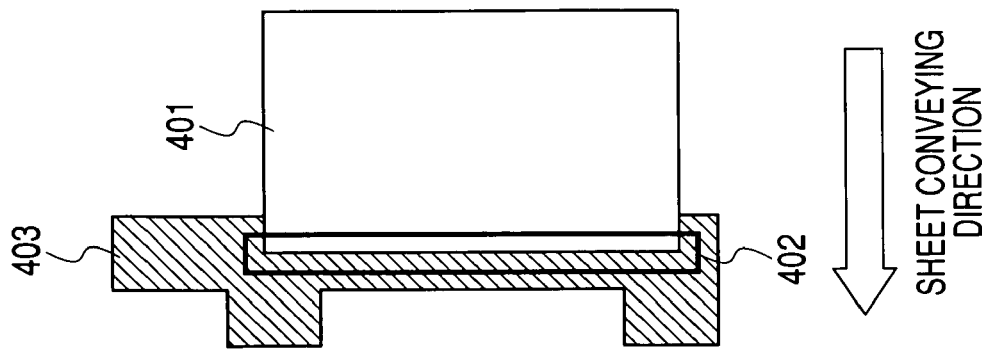

FIG. 10

| GROUP | SHEET GROUP | SHEET TYPE | | |
|---|---|---|---|---|
| GROUP 1 | PLAIN PAPER TYPE | PLAIN PAPER | POSTCARD | |
| GROUP 2 | COATED PAPER TYPE | COATED PAPER | MAT PAPER FOR PHOTOGRAPH | |
| GROUP 3 | GLOSSY PAPER TYPE | GLOSSY PAPER | PHOTOGRAPH SHEET | HIGH QUALITY PHOTOGRAPH SHEET |
| GROUP 4 | GLOSSY FILM TYPE | GLOSSY FILM | | |
| GROUP 5 | OHP FILM TYPE | OHP FILM | | |
| GROUP 6 | NO SHEET | — | | |

FIG. 11

| GROUP OR SHEET | COLOR CONVERSION TABLE | |
|---|---|---|
| | UPON BORDERED PRINTING | UPON BORDERLESS PRINTING |
| GROUP 1 | FOR PLAIN PAPER (WITH BORDER) | FOR (BORDERLESS) PLAIN PAPER |
| GROUP 2 | FOR MAT PAPER FOR PHOTOGRAPH | FOR MAT PAPER FOR PHOTOGRAPH |
| GROUP 3 | FOR PHOTOGRAPH SHEET | FOR PHOTOGRAPH SHEET |
| GROUP 4 | FOR GLOSSY FILM | — |
| GROUP 5 | FOR OHP FILM | — |
| PLAIN PAPER | FOR PLAIN PAPER (WITH BORDER) | FOR (BORDERLESS) PLAIN PAPER |
| POSTCARD | FOR POSTCARD | FOR POSTCARD |
| COATED PAPER | FOR COATED PAPER | — |
| MAT PAPER FOR PHOTOGRAPH | FOR MAT PAPER FOR PHOTOGRAPH | FOR MAT PAPER FOR PHOTOGRAPH |
| GLOSSY PAPER | FOR GLOSSY PAPER | FOR GLOSSY PAPER |
| PHOTOGRAPH SHEET | FOR PHOTOGRAPH SHEET | FOR PHOTOGRAPH SHEET |
| HIGH QUALITY PHOTOGRAPH SHEET | FOR HIGH QUALITY PHOTOGRAPH SHEET | FOR HIGH QUALITY PHOTOGRAPH SHEET |
| GLOSSY FILM | FOR GLOSSY FILM | — |
| OHP FILM | FOR OHP FILM | — |

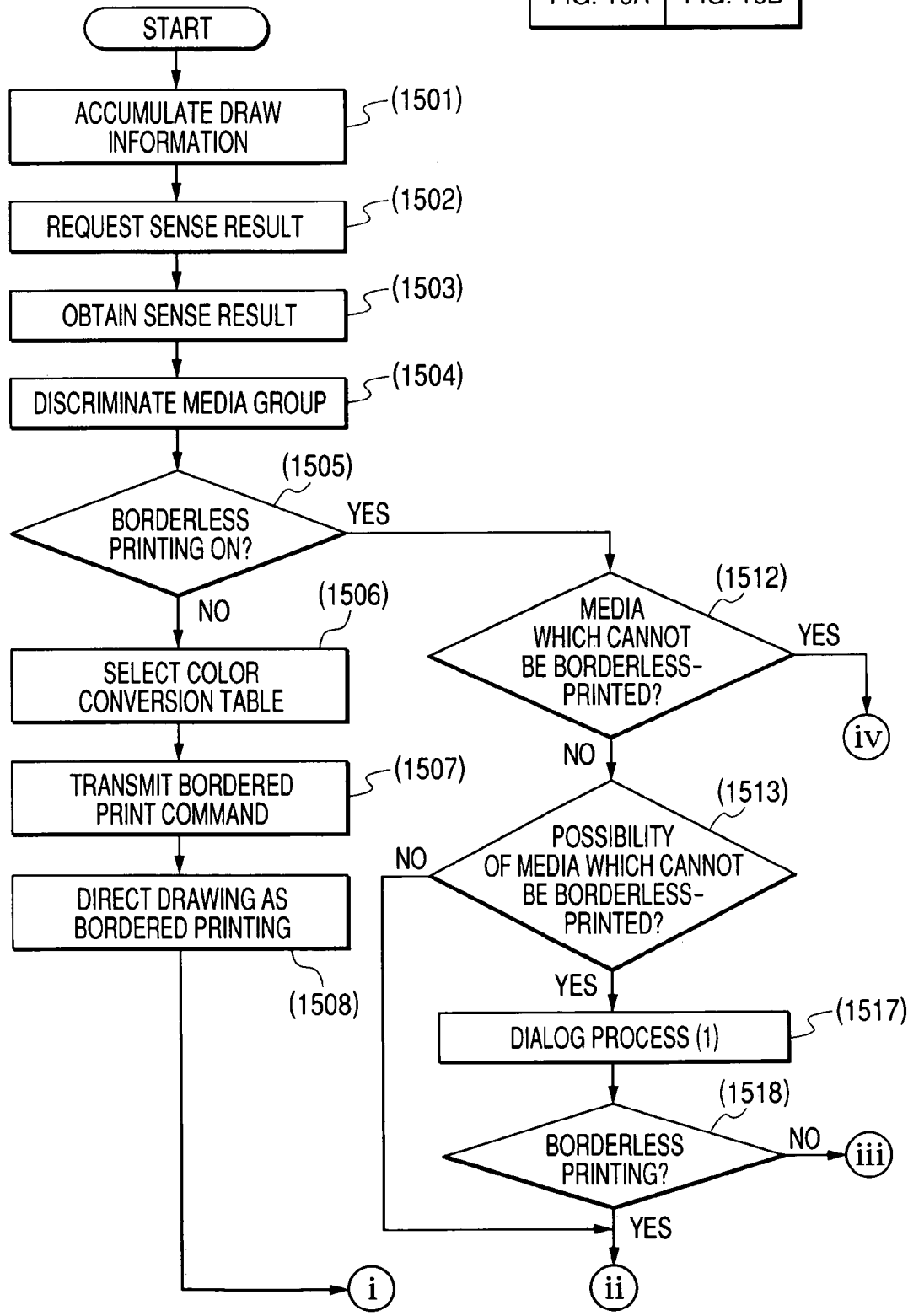

FIG. 20

| TYPE OF SHEET | DUPLEX PRINTING | BORDERLESS PRINTING | |
|---|---|---|---|
| | | 1ST SURFACE | 2ND SURFACE |
| PLAIN PAPER | POSSIBLE | IMPOSSIBLE | POSSIBLE |
| POSTCARD | POSSIBLE | IMPOSSIBLE | POSSIBLE |
| COATED PAPER | POSSIBLE | IMPOSSIBLE | IMPOSSIBLE |
| MAT PAPER FOR PHOTOGRAPH | POSSIBLE | POSSIBLE | POSSIBLE |
| GLOSSY PAPER | POSSIBLE | POSSIBLE | POSSIBLE |
| PHOTOGRAPH SHEET | POSSIBLE | POSSIBLE | POSSIBLE |
| HIGH QUALITY PHOTOGRAPH SHEET | POSSIBLE | POSSIBLE | POSSIBLE |
| GLOSSY FILM | IMPOSSIBLE | IMPOSSIBLE | — |
| OHP FILM | IMPOSSIBLE | IMPOSSIBLE | — |

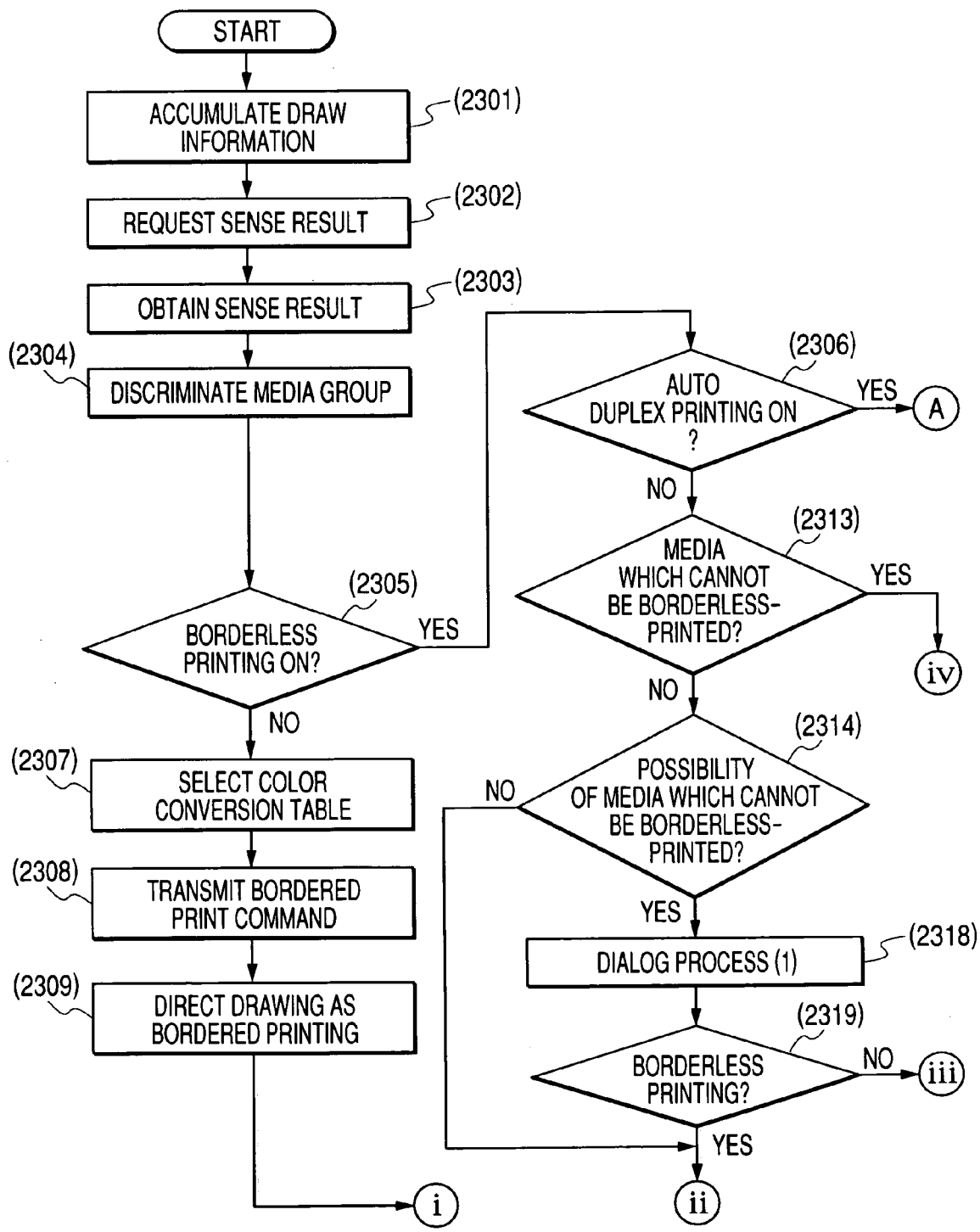

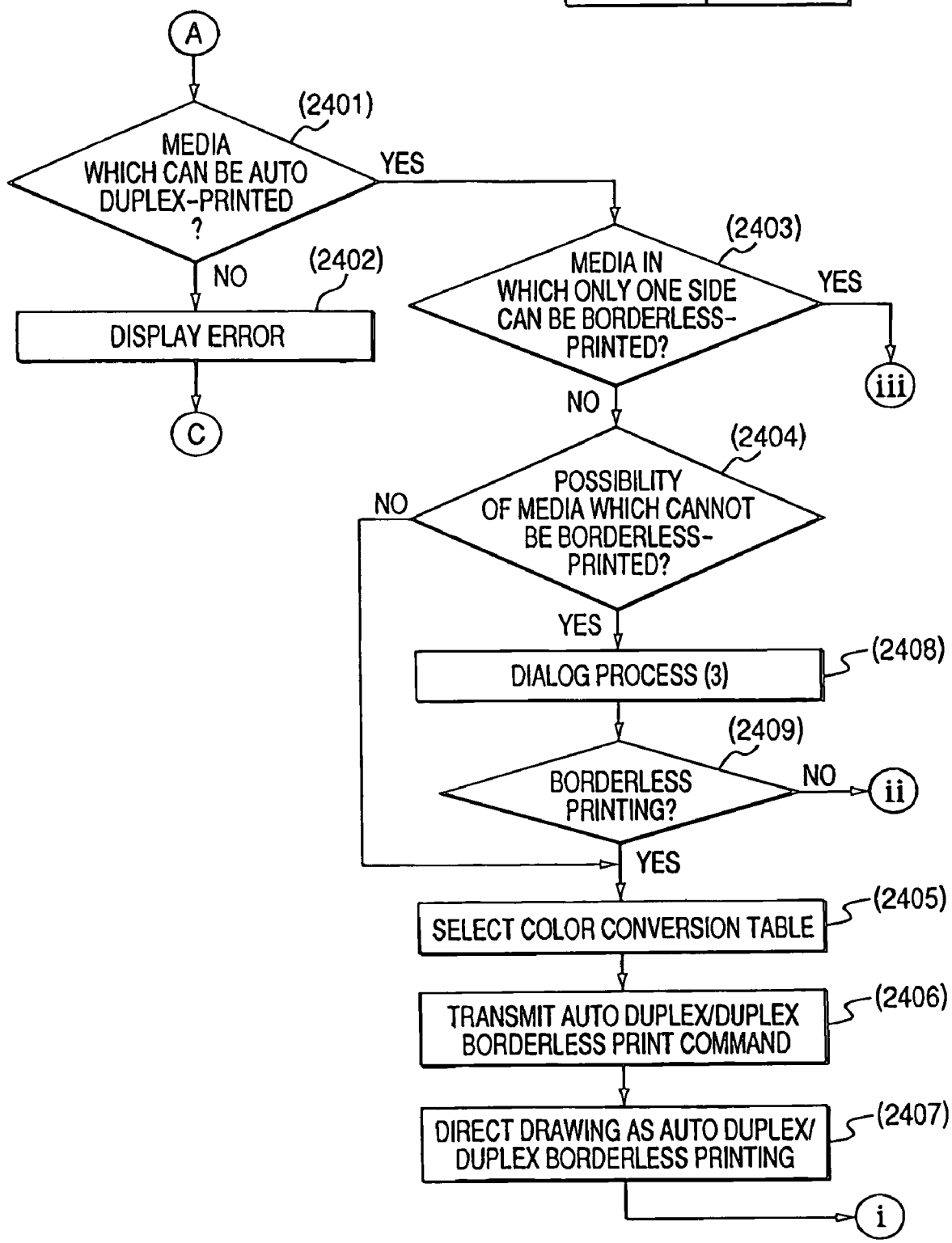

FIG. 31

STORING MEDIUM SUCH
AS FD/CD-ROM, ETC.

| DIRECTORY INFORMATION |
|---|
| 1ST DATA PROCESSING PROGRAM<br>A PROGRAM CODE GROUP CORRESPONDING TO STEPS<br>OF THE FLOWCHART SHOWN IN FIG. 16 |
| 2ND DATA PROCESSING PROGRAM<br>A PROGRAM CODE GROUP CORRESPONDING TO STEPS<br>OF THE FLOWCHARTS SHOWN IN FIGS. 24 AND 25 |
|  |

MEMORY MAP ON STORING MEDIUM

DATA PROCESSING APPARATUS, PRINTING APPARATUS, PRINT CONTROL METHOD, STORING MEDIUM STORING COMPUTER-READABLE PROGRAM THEREIN, AND PROGRAM

BACKGROUND OF THE INVENTION

1. Field of the Invention

In a printing system in which a data processing apparatus and a printing apparatus can communicate, the invention relates to the data processing apparatus for obtaining a type of recording medium which is fed in the printing apparatus and controlling a forming process of image information according to a set print mode, the printing apparatus, a print control method, a storing medium in which a computer-readable program has been stored, and the program.

2. Related Background Art

Hitherto, generally, a printing system is constructed by: a color printer which can output a color image; a host computer for controlling the printer and forming print data; and a communication interface for connecting the printer to the host computer.

Among such printers, there is a printer which can perform "borderless" printing onto the whole surface of a recording medium without leaving margins around the four peripheries of the recording medium.

In such a printer, after an image larger than a size of recording medium is formed, it is printed so as to lap out of the four peripheries of the recording medium to print onto the whole surface of the recording medium. Ink in lapping portions is absorbed by, for example, an ink absorber provided for a platen unit of the printer and collected. Upon such "borderless" printing, the user designates the execution of the "borderless" printing in the print setting on a printer driver, thereby executing a printing process based on the setting.

An ink jet printer among the color printers selectively uses a variety of sheets in accordance with the application. For example, as well as plain paper which is used in a copying apparatus or the like, the following various sheets exist: coated paper whose surface has been coated with silica or the like in order to suppress a blur of the ink and improve coloring; glossy paper which is used to form a photograph-like image such as a silver halide photograph; an OHP film for a transparent original; transfer paper for performing iron printing; a backprint film; and the like.

When the printing is performed to those sheets (media), the user previously selects a type of recording medium (sheet) serving as a print target in the print setting on the printer driver and executes the proper printing based on the setting.

In recent years, there is a printer equipped with a sensor called a media sensor for automatically discriminating the type of sheet.

In such a printer, as shown in FIG. 3, the types of sheets to be classified are mainly classified into about five types (regions surrounded by broken lines in the diagram) and a color process and print quality suitable for each group are selected. In this example, light is irradiated onto the sheet surface and intensity of the reflection light (regular reflection light and diffusion reflection light) is used for the discrimination.

There has also been proposed a printer in which a size of sheet instead of the type of sheet is discriminated and, when it is intended to print data which laps out of the sheet size, the data is edited in accordance with the sheet size (refer to Japanese Patent Application Laid-Open No. H05-147304).

However, the above conventional techniques have the following problems.

For example, when the "borderless" printing is executed to the whole surface, since the ink is deposited up to edge portions of the sheet, there is a case where the sheet is curled considerably in dependence on the type of sheet which is used.

If the printing is continued in such a curled state, a movable part in the printer can be come into contact with the curled sheet and cause a failure.

The sheet can be also caught into the movable part and cause a paper jam. Therefore, if the sheet which is improper for the "borderless" printing is selected as a type of sheet upon print setting on the printer driver, designation of the "borderless" printing is inhibited.

However, in the general ink jet printer without the media sensor, there is a possibility that the user does not perform the proper setting with respect to the type of sheet and the "borderless" printing is executed in the improper sheet setting. Particularly, in the case where the "borderless" printing is possible in the default sheet type, there is a possibility that the user who does not have enough knowledge of the setting of the sheet type executes only the designation of the "borderless" printing and completes the print setting without setting the sheet type.

In such a case, if the user sets a sheet which is improper for the "borderless" printing and executes the print starting operation, there is a fear that a printer main body is damaged or the sheet is jammed and the sheet and ink are wasted.

To solve a part of the above problems, there has been proposed a printer which is equipped with the media sensor that can specify the type of sheet and automatically performs the print setting suitable for the sheet type. However, the following problems still exist in such a case.

That is, when the sheet discriminated by the media sensor is improper for the "borderless" printing, the printing process by the printer driver has to be stopped in order to block the "borderless" printing to the sheet.

Consequently, although the damage to the printer main body or the wasteful consumption of the sheet and ink can be avoided, in order to obtain an image output, the user has to execute such a troublesome operation requiring predetermined knowledge that after he changes the setting on the printer driver and designates the execution of the printing with a border, he again instructs the printing.

In the printer in which the sheet size is discriminated, although data which cannot be fully enclosed in the sheet size can be outputted in accordance with the sheet size, nothing is considered about a difference of conditions due to a difference of sheet types of the same sheet size that enables or disables the "borderless" printing.

SUMMARY OF THE INVENTION

The invention is made to solve the above problems and it is the first object of the invention to provide a data processing apparatus which has a detecting unit of characteristics information of a sheet which is conveyed to a printing unit and can communicate with a printing apparatus which can convey the sheet and set a print mode for printing onto the whole or a part of the surface of the sheet, wherein when a whole surface print mode has been designated for image information, the characteristics information of the sheet is obtained from the printing apparatus, whether or not the printing to the whole surface of the sheet is proper is discriminated on the basis of the obtained characteristics information and discrimination data which is stored, the image information which is formed is corrected by executing a predetermined image process thereto on the basis of a discrimination result, and thereafter, the corrected image information is outputted to the printing apparatus, thereby automatically discriminating a type of sheet, and when the user selects a print mode for executing borderless printing, if the printing to the whole surface is improper with the discriminated sheet type, the designation of the whole surface printing is automatically cancelled, and the image information is outputted with margins on the sheet, so that various faults which are caused in the printing unit when the printing to the whole surface is executed to the sheet whose whole surface printing is improper can be prevented, and ease of use is excellent. A print control method, a storing medium in which a computer-readable program has been stored, and the program for such a data processing apparatus are also provided.

It is the second object of the invention to provide a printing apparatus which has a detecting unit of characteristics information of a sheet which is conveyed to a printing unit, conveys the sheet, and outputs image information that is transferred from a data processing apparatus to the whole or a part of the surface of the sheet, wherein when a whole surface print mode has been designated to the image information, the characteristics information of the sheet which can be detected by the detecting unit is obtained, whether or not the printing to the whole surface of the sheet is proper is discriminated on the basis of the obtained characteristics information, the image information which is transferred from the data processing apparatus is corrected by executing a predetermined image process thereto on the basis of a discrimination result, and control is made so as to output the corrected image information or the image information whose whole surface printing is possible to the printing unit, a type of sheet is automatically discriminated, and when the user selects a print mode for executing the borderless printing, if the printing to the whole surface is improper with the sheet type discriminated on the printing apparatus side, the designation of the whole surface printing is automatically cancelled, and the image information is outputted with margins on the sheet, so that various faults which are caused in the printing unit when the printing to the whole surface is executed to the sheet whose whole surface printing is improper can be prevented, and ease of use is excellent. A print control method, a storing medium in which a-computer-readable program has been stored, and the program for such a printing apparatus are also provided.

It is the third object of the invention to provide a data processing apparatus in which a sense result of a media is obtained, whether or not the media is a media which can be borderless-printed is discriminated on the basis of the obtained result, and when it is determined that it is not the media which can be borderless-printed, such a fact is warned, or the sense result of the media is obtained the presence or absence of a possibility of the media which cannot be borderless-printed is discriminated on the basis of the obtained result, when it is determined that there is a possibility of the media which cannot be borderless-printed, such a fact is warned, thereby properly notifying the user whether the sensed media is the media which can be borderless-printed or the media which cannot be borderless-printed, and it is possible to avoid such a situation that the printing to the media which cannot be borderless-printed is executed. A print control method, a storing medium in which a computer-readable program has been stored, and the program for such a data processing apparatus are also provided.

A data processing apparatus of the invention to accomplish the above objects has the following construction.

There is provided a data processing apparatus which has a detecting unit of characteristics information of a sheet that is conveyed to a printing unit and can communicate with a printing apparatus which can convey the sheet and set a print mode for printing onto the whole or a part of the surface of the sheet, comprising: characteristics information obtaining means for obtaining the characteristics information of the sheet from the printing apparatus; storing means for storing discrimination data for group-discriminating the characteristics information of the sheet which can be detected by the detecting unit; fitness discriminating means for discriminating whether or not the printing to the whole surface of the sheet is proper on the basis of the characteristics information obtained by the characteristics information obtaining means and the discrimination data; image correcting means for, when a whole surface print mode has been designated for image information which is formed, correcting the image information by executing a predetermined image process thereto on the basis of a discrimination result by the fitness discriminating means; and output means for outputting the image information corrected by the image correcting means to the printing apparatus.

A printing apparatus of the invention to accomplish the above objects has the following construction.

There is provided a printing apparatus which has a detecting unit of characteristics information of a sheet which is conveyed to a printing unit, conveys the sheet, and outputs image information that is transferred from a data processing apparatus to the whole or a part of the surface of the sheet, comprising: characteristics information obtaining means for obtaining the characteristics information of the sheet which can be detected by the detecting unit; fitness discriminating means for discriminating whether or not the printing to the whole surface of the sheet is proper on the basis of the characteristics information obtained by the characteristics information obtaining means; image correcting means for, when a whole surface print mode has been designated to the image information, correcting the image information by executing a predetermined image process to the image information transferred from the data processing apparatus on the basis of a discrimination result by the fitness discriminating means; and control means for controlling so as to output the image information corrected by the image correcting means or the image information whose whole surface printing is possible to the printing unit.

A data processing apparatus of the invention to accomplish the above objects comprises: obtaining means for obtaining a sense result of a media; discriminating means for discriminating whether or not the media is a media which can be borderless-printed on the basis of an obtainment result by the obtaining means; and warning means for warning if it is determined by the discriminating means that the media is not the media which can be borderless-printed.

A data processing apparatus of the invention to accomplish the above objects comprises: obtaining means for obtaining a sense result of a media; discriminating means for discriminating whether or not there is a possibility that the media is a media which cannot be borderless-printed on the basis of an obtainment result by the obtaining means; and warning means for warning if it is determined by the discriminating means that there is a possibility that the media is the media which cannot be borderless-printed.

Further, a print control method of the invention to accomplish the above objects has the following construction.

There is provided a print control method for a data processing apparatus which has a detecting unit of characteristics information of a sheet that is conveyed to a printing unit and can communicate with a printing apparatus which can convey the sheet and set a print mode for printing onto the whole or a part of the surface of the sheet, comprising: a characteristics information obtaining step of obtaining the characteristics information of the sheet from the printing apparatus; a fitness discriminating step of discriminating whether or not the printing to the whole surface of the sheet is proper on the basis of the characteristics information obtained by the characteristics information obtaining step and discrimination data for group-discriminating the characteristics information of the sheet which is stored and can be detected by the detecting step; an image correcting step of, when a whole surface print mode has been designated for image information which is formed, correcting the image information by executing a predetermined image process thereto on the basis of a discrimination result by the fitness discriminating step; and an output step of outputting the image information corrected by the image correcting step to the printing apparatus.

Further, a print control method of the invention to accomplish the above objects has the following construction.

There is provided a print control method for a printing apparatus which has a detecting unit of characteristics information of a sheet which is conveyed to a printing unit, conveys the sheet, and outputs image information that is transferred from a data processing apparatus to the whole or a part of the surface of the sheet, comprising: a characteristics information obtaining step of obtaining the characteristics information of the sheet which can be detected by the detecting unit; a fitness discriminating step of discriminating whether or not the printing to the whole surface of the sheet is proper on the basis of the characteristics information obtained by the characteristics information obtaining step; an image correcting step of, when a whole surface print mode has been designated to the image information, correcting the image information by executing a predetermined image process to the image information transferred from the data processing apparatus on the basis of a discrimination result by the fitness discriminating step; and a control step of controlling so as to output the image information corrected by the image correcting step or the image information whose whole surface printing is possible to the printing unit.

A print control method of the invention to accomplish the above objects comprises: an obtaining step of obtaining a sense result of a media; a discriminating step of discriminating whether or not the media is a media which can be borderless-printed on the basis of an obtainment result by the obtaining step; and a warning step of warning if it is determined by the discriminating step that the media is not the media which can be borderless-printed.

A print control method of the invention to accomplish the above objects comprises: an obtaining step of obtaining a sense result of a media; a discriminating step of discriminating whether or not there is a possibility that the media is a media which cannot be borderless-printed on the basis of an obtainment result by the obtaining step; and a warning step of warning if it is determined by the discriminating step that there is a possibility that the media is the media which cannot be borderless-printed.

BRIEF DESCRIPTION OF THE DRAWINGS

FIG. 5 is a diagram showing the operation of the printer upon image recording in "borderless" printing by the printer according to the invention;

FIG. 6 is a diagram showing the operation of the printer upon image recording in "borderless" printing by the printer according to the invention;

FIG. 7 is a diagram showing the operation of the printer upon image recording in "borderless" printing by the printer according to the invention;

FIG. 10 is a diagram showing a relation between a group of sheets which can be discriminated by the media sensor shown in FIG. 1 and the sheets included in the group;

FIG. 11 is a diagram showing a relation between groups or the sheets in a data processing apparatus shown in FIG. 1 and a color conversion table adapted to them;

FIG. 20 is a diagram for explaining a correspondence relation between a possibility of duplex printing and a possibility of the "borderless" printing of each sheet type which are managed by the data processing apparatus according to the invention;

FIG. 31 is a diagram for explaining a memory map on a storing medium for storing various data processing programs which can be read out by the data processing apparatus according to the invention.

DESCRIPTION OF THE PREFERRED EMBODIMENTS

The invention will be described in detail hereinbelow on the basis of embodiments shown in the diagrams.

In the following description, "USB" is an abbreviation of "Universal Serial Bus" and since it is a well-known interface which enables bidirectional communication, its detailed explanation is omitted here.

First Embodiment

Figure 1:
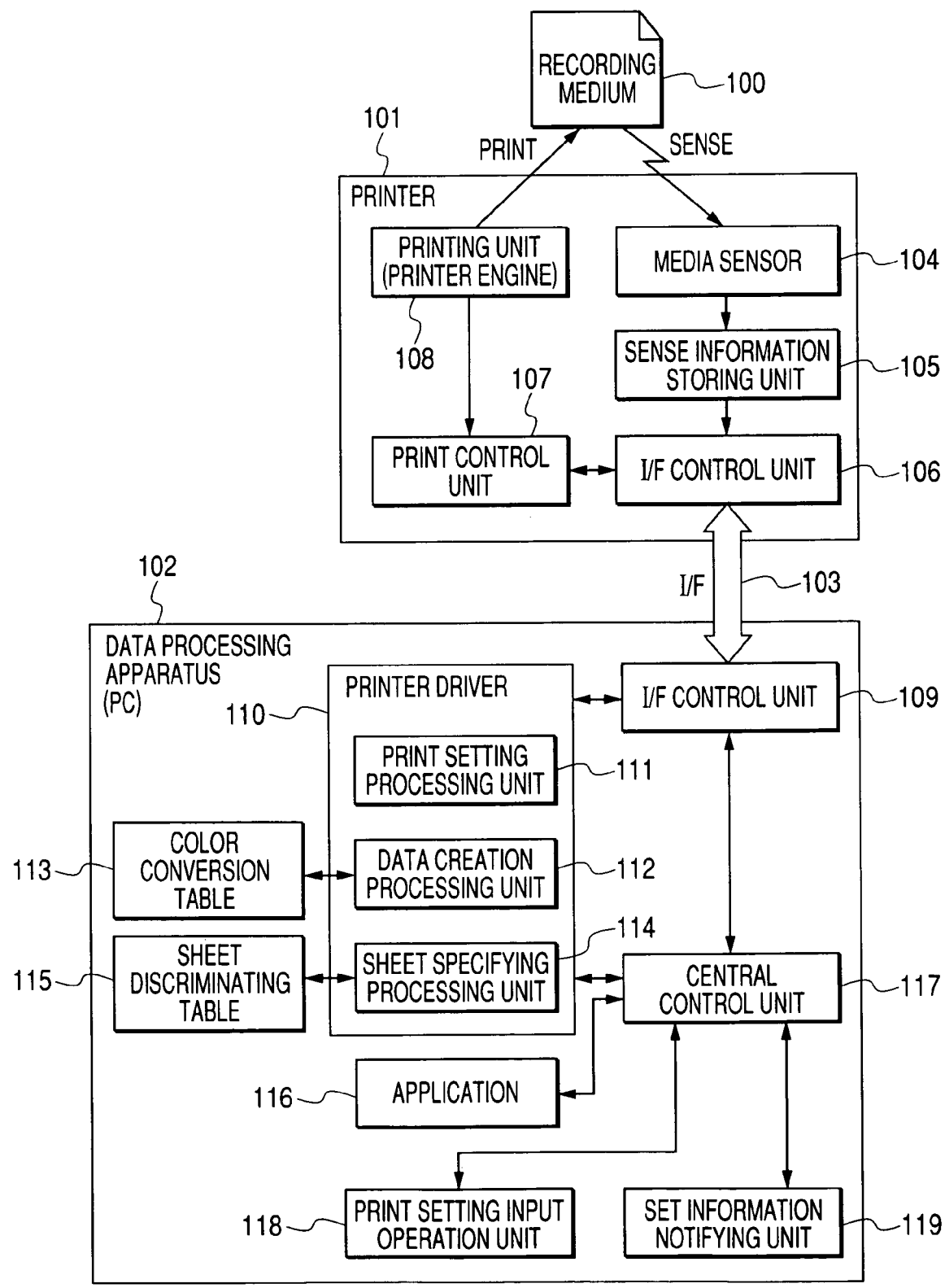
FIG. 1 is a block diagram showing a construction of a printing system in the first embodiment of the invention.

FIG. 1 is a block diagram showing a construction of a printing system in the first embodiment of the invention.

In FIG. 1, reference numeral 101 denotes a color printer (also simply referred to as a printer hereinbelow) of an ink jet system for forming an image. The printer forms the image on the basis of print data formed by a PC 102, which will be explained hereinafter. Although a type of printer is not limited so long as the "borderless" printing is possible, the color printer of the ink jet system is presumed here. The printer 101 is constructed by the following various functional blocks 104 to 108.

Reference numeral 102 denotes the data processing apparatus (PC) for forming the print data and controlling the connected printer 101. A personal computer (hereinbelow, abbreviated to "PC") is presumed here. The PC 102 also plays a role of receiving an instruction or an input from the user regarding the print setting.

The PC 102 is constructed by various functional blocks 109, 110, and 116 to 119. Although not shown in the diagram, "Windows" (registered trademark) made by Microsoft Corporation has been installed as an operating system (hereinbelow, also abbreviated to "OS") for controlling the PC 102. The above various functional blocks are made operative by using the functions of the OS.

Reference numeral 103 denotes a communication interface (I/F) for connecting the PC 102 to the printer 101. Although the USB as a serial interface is presumed here, any other wire/radio interfaces can be used so long as the bidirectional communication can be realized. For example, it is possible to use IEEE1394, Ethernet (registered trademark), IrDA (registered trademark), IEEE802.11, a power line, or the like, or a parallel interface such as Centronics, SCSI, or the like.

As mentioned above, the printing system in the embodiment is not a single apparatus but has a construction in which the PC 102 and the printer 101 to form the image are connected by the specific bidirectional interface. However, the invention is not limited to such an example but can be also applied to a hybrid type printing system in which the functions of the PC and the printer as mentioned above are integratedly implemented.

Among functions of the printer 101 and PC 102, explanation of the functions which are not particularly necessary upon explanation of features of the embodiment is omitted here.

In the printer 101, reference numeral 104 denotes a sheet recognizing sensor (media sensor) for obtaining information to specify a type of recording medium 100. It is assumed that the recording medium 100 has been stacked on a sheet feeder, a paper feed tray, a sheet cassette, or the like equipped for the printer 101.

As means for grasping a feature amount for discriminating the type of sheet, the following various kinds of means exist: means for previously marking a sheet as a recording medium and optically detecting the marks; means using a dedicated sheet cassette; means for embedding an IC card into the sheet; means for optically detecting reflection light (regular reflection light and diffusion reflection light) of specific light irradiated onto the sheet; means for directly or indirectly measuring surface roughness; means for measuring transmittance of the light; and the like.

As other realizing means, there are means for discriminating the sheet type on the basis of a weight, a thickness, a coefficient of friction, a dielectric constant, an electric resistance value, or a coefficient of water absorption of the sheet, or a feature amount obtained by photographing a two-dimensional image, and the like.

Those detecting means realize the sheet recognizing function in a form of a single detecting means or a combination of a plurality of means. Although a principle and a construction of the media sensor 104 are not particularly limited here, it is assumed that the media sensor 104 has the function which can discriminate at least the presumed types of sheets.

Figure 12:
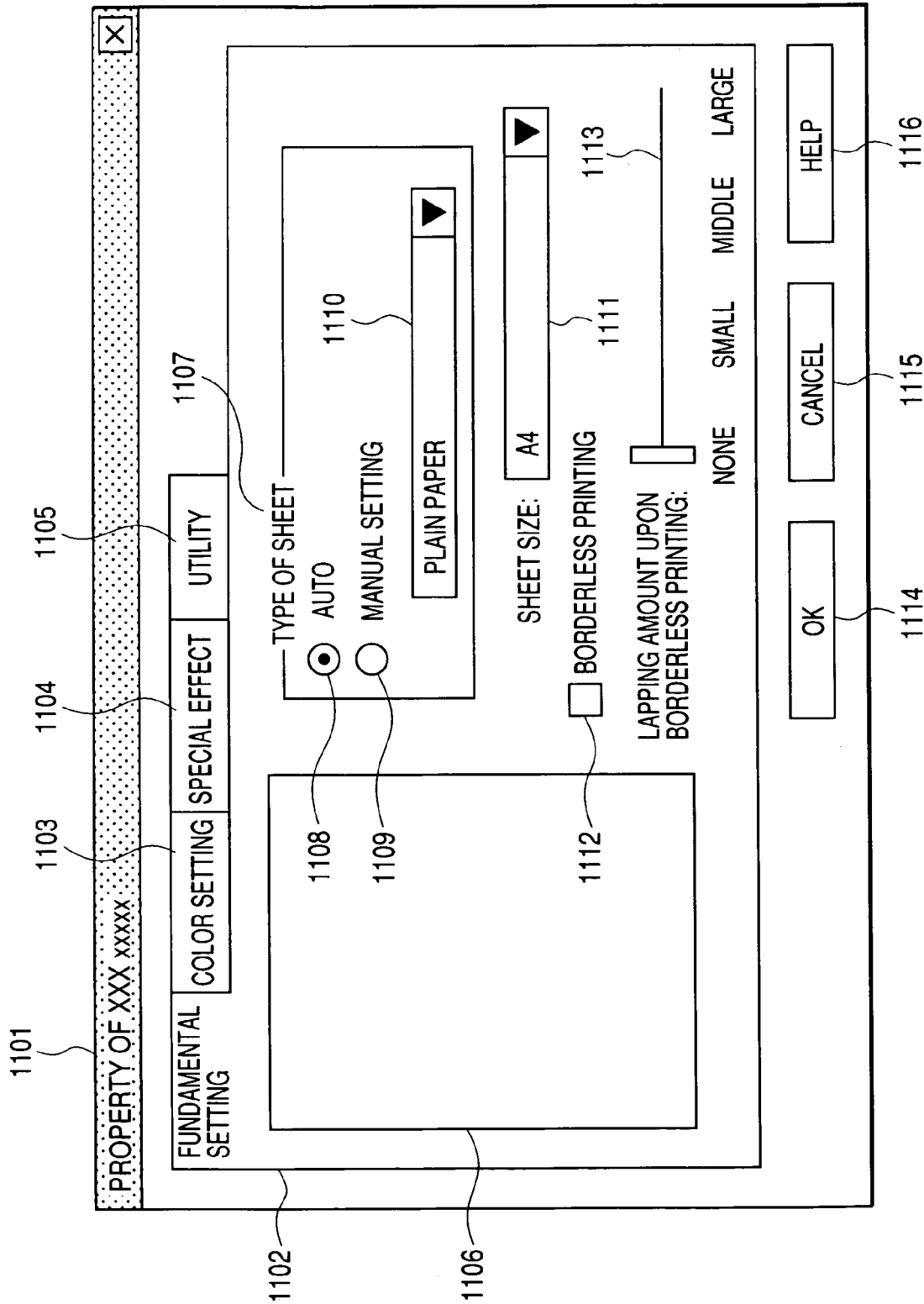
FIG. 12 is a diagram showing an example of a print setting dialog which is displayed on a display unit provided for a print setting input operation unit of the data processing apparatus shown in FIG. 1.

The media sensor 104 which is presumed in the embodiment is a device of a relatively low price which can be attached to a product and in which sheet recognizing precision is not very high. It is assumed that the media sensor 104 does not have the precision to correctly recognize all sheets that can be selected by a sheet type selecting portion 1110 in a print setting dialog 1101 as shown in FIG. 12, which will be explained hereinafter. That is, it means that the media sensor 104 functions as a sensor which can make a group discrimination based on each area discrimination shown in FIG. 10.

Reference numeral 105 denotes a sense information storing unit for storing the information (feature amount) regarding the sheet obtained by the media sensor 104. If the sense information storing unit 105 is constructed by a nonvolatile memory medium, a plurality of sense information can be stored and managed together with their histories. Reference numeral 106 denotes an I/F control unit for performing an interface function of the printer 101. Since the presumed interface is the USB here, it is assumed that the I/F control unit 106 is constructed by a controller on a peripheral equipment side of the USB. As an example of data communication, transmission of sheet information, reception of the print data and control commands, and the like are executed.

Status information such as error occurred in the main body of the printer 101, communication state, and the like is also returned to the PC 102 if there is a request.

Reference numeral 107 denotes a print control unit for receiving the print data transmitted from the PC 102 and developing it into image data which can be transferred to a printer engine 108. The print data transmitted from the PC 102 is data which includes the type, size, and the like of the sheet and to which an image process has already been executed on the PC 102 side on the basis of the print setting. The print control unit 107 controls the printer engine 108 in response to a print control command included in the print data.

Specifically speaking, for example, data constructed by binary data for printing (intermediate data before binarization in dependence on the case) and various commands for controlling an injection amount of ink, the number of passes, a printing direction, and a conveyance amount of the sheet is used here.

Reference numeral 108 denotes the printing unit (printer engine) for printing onto the recording medium 100 on the basis of the print data developed by the print control unit 107. Since the printer 101 is a printer of the ink jet system, an image is formed by emitting the ink.

In the data processing apparatus 102, reference numeral 109 denotes an I/F control unit for performing an interface function of the PC 102.

The I/F control unit 109 is constructed by a controller on a host computer side of the USB and has a function as a USB host. A part of the functions as a USB host can be also constructed by software such as OS, driver, or the like.

Reference numeral 110 denotes a printer driver serving as software (program module) for executing various settings for printing, creation of the print data, and control of the printer on the PC 102. A printer driver system is constructed by various functional blocks 111 to 115.

In the data processing apparatus 102, reference numeral 111 denotes a print setting processing unit for performing various print settings including setting of the sheet, setting of print quality, and the like. The print setting processing unit 111 also has a function for receiving the instruction or input from the user and displaying or notifying the set contents.

Reference numeral 112 denotes a data creation processing unit for printing. The data creation processing unit 112 executes various image processes such as color conversion, halftone process, and the like in accordance with the print setting performed by the printer 101 and the print setting processing unit 111, forms the print data in a peculiar format which can be interpreted by the printer 101, and forms a command for printer control.

The above functional block is a fundamental portion of the invention and has a function for forming print data as will be explained hereinafter on the basis of the sheet information sent from the printer 101 in accordance with the sheet type detected by the media sensor 104. Details about the processes from the obtainment of the sheet information to the creation of the print data will be explained hereinafter with reference to FIGS. 15 and 16. Reference numeral 113 denotes a color conversion table which is referred to when the data creation processing unit 112 executes a color conversion arithmetic operating process.

Reference numeral 114 denotes a sheet specifying processing unit for specifying the sheet type on the basis of an output result of the media sensor 104 (which is obtained from the printer 101). In the embodiment, the sheet type is specified by using a sheet discriminating table 115 for reference. The output information necessary upon specifying the sheet from the media sensor 104 is sent to the PC 102 through the I/F 103. The sheet specifying processing unit 114 executes a sheet specifying process (which will be explained hereinafter in detail) on the basis of the received sheet information.

Reference numeral 116 denotes various application software for forming data to be printed by the user. As applications 116, since a field, an application, and installation details of the software are not limited to those of a word processor, spreadsheet software, an E-mail reader, a WWW browser, image processing software, and the like so long as they can execute the printing by the printer 101 through the printer driver 110 by using the standard functions of the OS, their detailed description is omitted here.

Reference numeral 117 denotes a central control unit for controlling various functions of the PC 102. The functions of the CPU correspond to them. Reference numeral 118 denotes a print setting input operation unit constructed by various input devices (keyboard, pointing device, etc.) for reflecting the intention of the user to the print setting.

Various data processes of the central control unit 117 are controlled by an operating system (OS) which is loaded into an internal memory such as a RAM or the like from an external storing device (not shown).

Reference numeral 119 denotes a set information notifying unit for notifying the user of the print setting and its change information. As a notifying method, a case of using a display apparatus such as a monitor or the like (constructed so that a print setting display screen or dialogs, which will be explained hereinafter, can be displayed), notification by a voice, or the like is considered.

The "borderless" printing function of the ink jet printer in the embodiment will now be described with reference to FIGS. 2 to 6.

Figure 2:
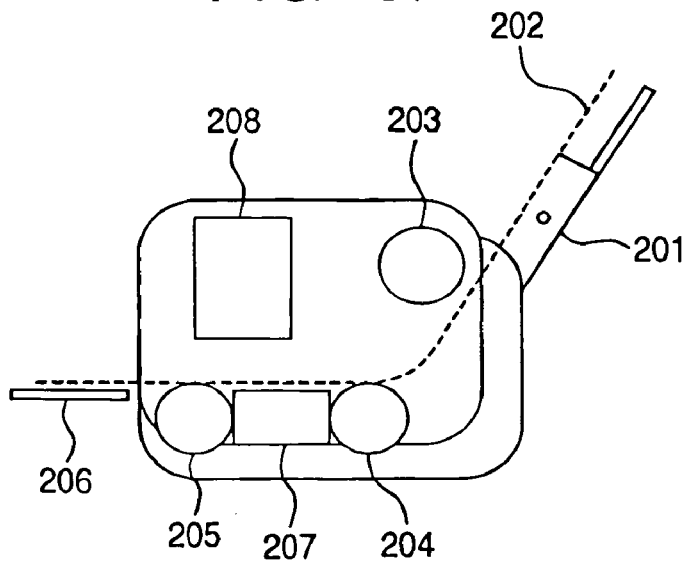
FIG. 2 is a schematic cross sectional view for explaining an example of a printer shown in FIG. 1.

FIG. 2 is a schematic cross sectional view for explaining an example of the printer 101 shown in FIG. 1 and corresponds to the case where the printer in the embodiment is seen from the side.

In FIG. 2, reference numeral 201 denotes an auto sheet feeder. The recording media which are subjected to the printing are stacked on the auto sheet feeder 201. A plurality of recording media can be simultaneously stacked. In this case, the stacked recording media are sequentially fed one by one from the top.

Reference numeral 202 denotes a path along which the recording media stacked on the auto sheet feeder 201 is fed, conveyed, image-formed, and ejected.

Reference numeral 203 denotes a paper feed roller which functions for feeding a top one of the recording media stacked on the auto sheet feeder 201 to a subsequent conveying mechanism; 204 a conveying roller; and 205 a paper ejecting roller. The recording medium is conveyed on the path 202 by the rotation of those rollers, other rollers combined therewith, and the like.

Reference numeral 206 denotes a paper ejecting tray on which the recording medium ejected from the printer main body by the paper ejecting roller 205 is held; 207 a platen for supporting the recording medium which is being conveyed; and 208 a recording head for recording an image by ejecting ink droplets onto the recording medium supported by the platen 207. A construction of the recording head 208 differs depending on the type and number of inks which are used.

It is assumed that the media sensor 104 shown in FIG. 1 has such a construction that the sensor is attached so that it can sense the type of sheets stacked on a paper feed tray, sheet feeder, or exclusive cassette and it can sense the sheet type before the sheet is fed.

Sensing timing of the media sensor 104 can be set to any timing so long as the media sensor 104 can respond obtained information when the printer driver 110 requests to obtain sheet information. Although it is now assumed that the sensing timing is set to the time of turn-on of a power source of the printer 101, for example, it is also possible to use such a construction that the sheet type is immediately sensed at the time of the obtaining request from the printer driver 110.

Figure 3:
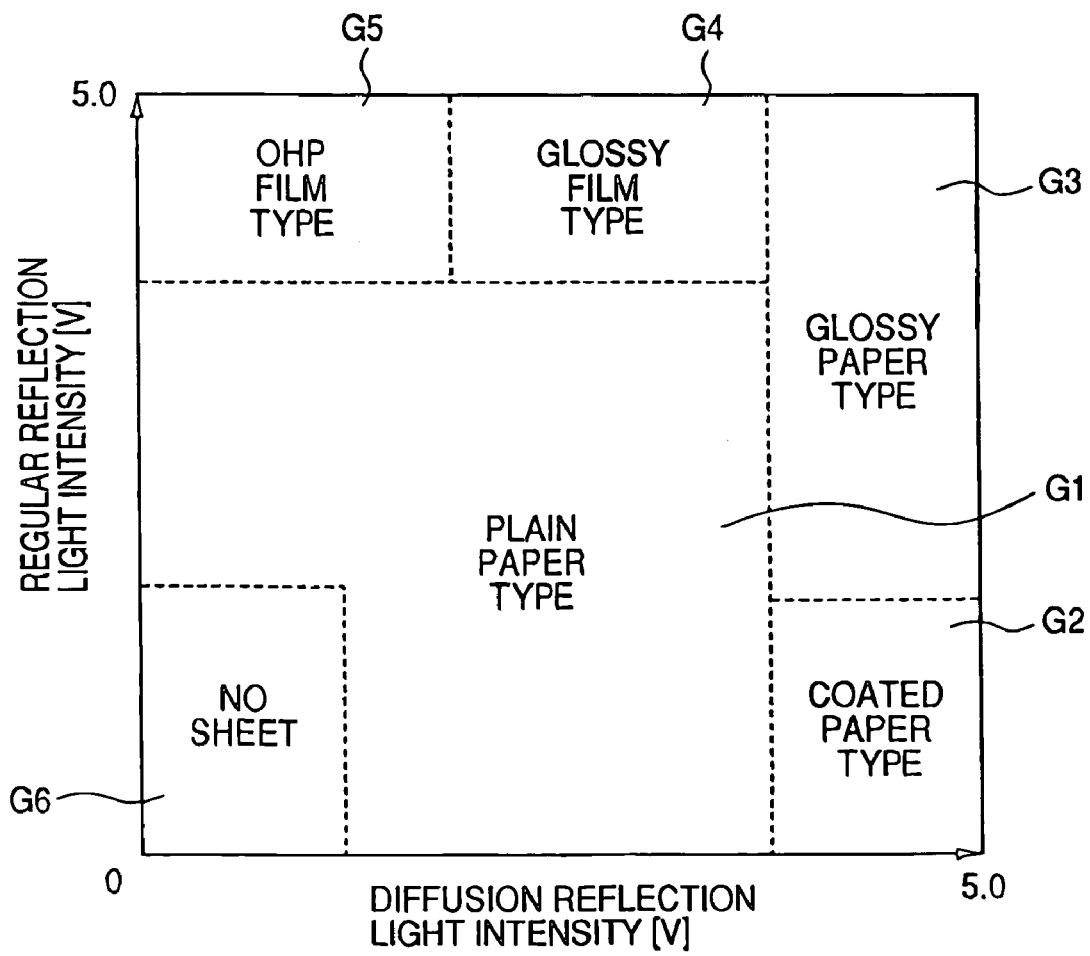
FIG. 3 is a characteristics diagram for discriminating a type region which can be sensed by a media sensor shown in FIG. 1.

FIG. 3 is a characteristics diagram for discriminating a type region which can be sensed by the media sensor 104 shown in FIG. 1. An axis of ordinate indicates a regular reflection light intensity and an axis of abscissa indicates a diffusion reflection light intensity.

In FIG. 3, an amount of optical reflection light which is detected by the media sensor 104 is photoelectrically converted. The sheet information peculiar to the recording medium is discriminated as specific Groups G1 to G6. The group regions correspond to Groups G1 to G6 shown in FIG. 10, respectively.

Figure 4:
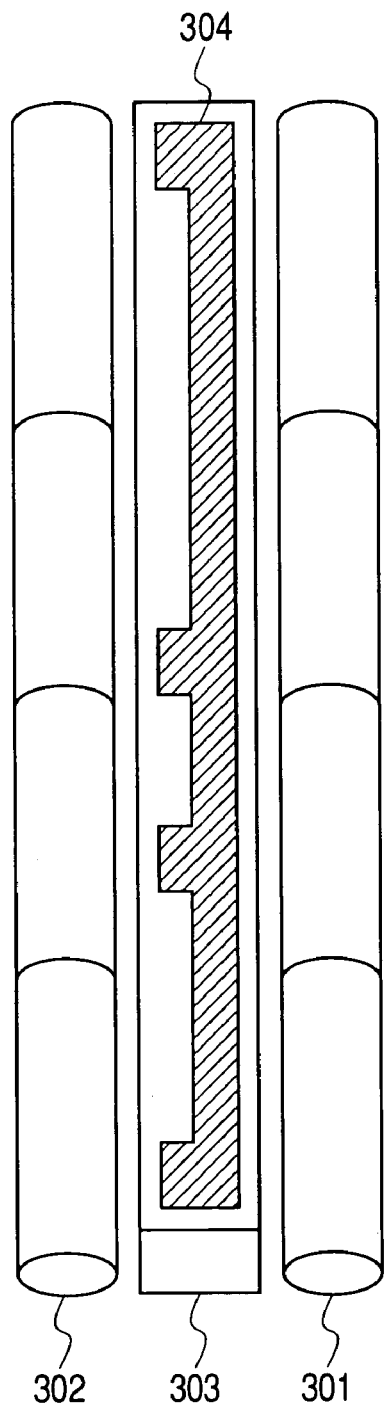
FIG. 4 is a diagram for explaining a layout of conveying rollers, paper ejecting rollers, and a platen shown in FIG. 2.

FIG. 4 is a diagram for explaining a layout of the conveying roller 204, paper ejecting roller 205, and platen 207 shown in FIG. 2 and corresponds to the state where the printer shown in FIG. 2 is seen from the upper oblique direction.

In FIG. 4, reference numeral 301 denotes conveying roller; 302 paper ejecting rollers; and 303 a platen for supporting the recording medium between those rollers.

As shown in FIG. 4, a hole is formed in the platen 303 in the direction which crosses the sheet conveying direction and an ink absorber 304 is provided in the hole. The ink absorber 304 is provided in a dent shape for the platen 303 so that it is not come into contact with the recording medium which is conveyed.

FIGS. 5 to 7 are diagrams showing the operation of the printer upon image recording in the "borderless" printing by the printer according to the invention and show the state, for example, at the time of recording the image onto a front edge portion of the recording medium.

In FIG. 5, an image is recorded onto a conveyed recording medium 401 in a range 402 which laps from the front edge and the right and left edges. The ink of the lapping portions is absorbed into an ink absorber 403 and collected. In the front edge portion of the recording medium, since conveying precision of the recording medium is generally lower than that in the intermediate portion, a conveyance width of the recording medium per operation is narrowed and the image recording is executed only in the narrow range corresponding to such a narrow width in the conveying direction.

FIG. 6 shows the state upon image recording to the intermediate portion of the recording medium. In a manner similar to FIG. 5, the image is recorded into a range 502 which laps from the right and left edges of a recording medium 501 and the ink of the lapping portions is absorbed into an ink absorber 503 and collected. At this point of time, since the recording medium can be conveyed at enough high precision, the conveyance width of the recording medium per operation is widened more than a rectangular frame region shown in FIG. 5 and the image recording to a wide range in which performance of the recording head 208 is made the most of is executed.

FIG. 7 shows the state upon image recording to the rear edge portion of the recording medium. The image is recorded onto an ejected recording medium 601 in a range 602 which laps from the rear edge and the right and left edges of the recording medium. The ink of the lapping portions is absorbed into an ink absorber 603 and collected. In the rear edge portion of the recording medium, since the conveying precision deteriorates in a manner similar to that of the front edge portion, the image recording is executed only in a range of a rectangular frame region narrower than the rectangular frame region shown in FIG. 6.

Although an example of the "borderless" printing mechanism and the operation in the ink jet printer has been shown above in FIGS. 2 and 4 to 7, the printer can also have a different construction so long as it has the "borderless" printing function.

Figure 8:
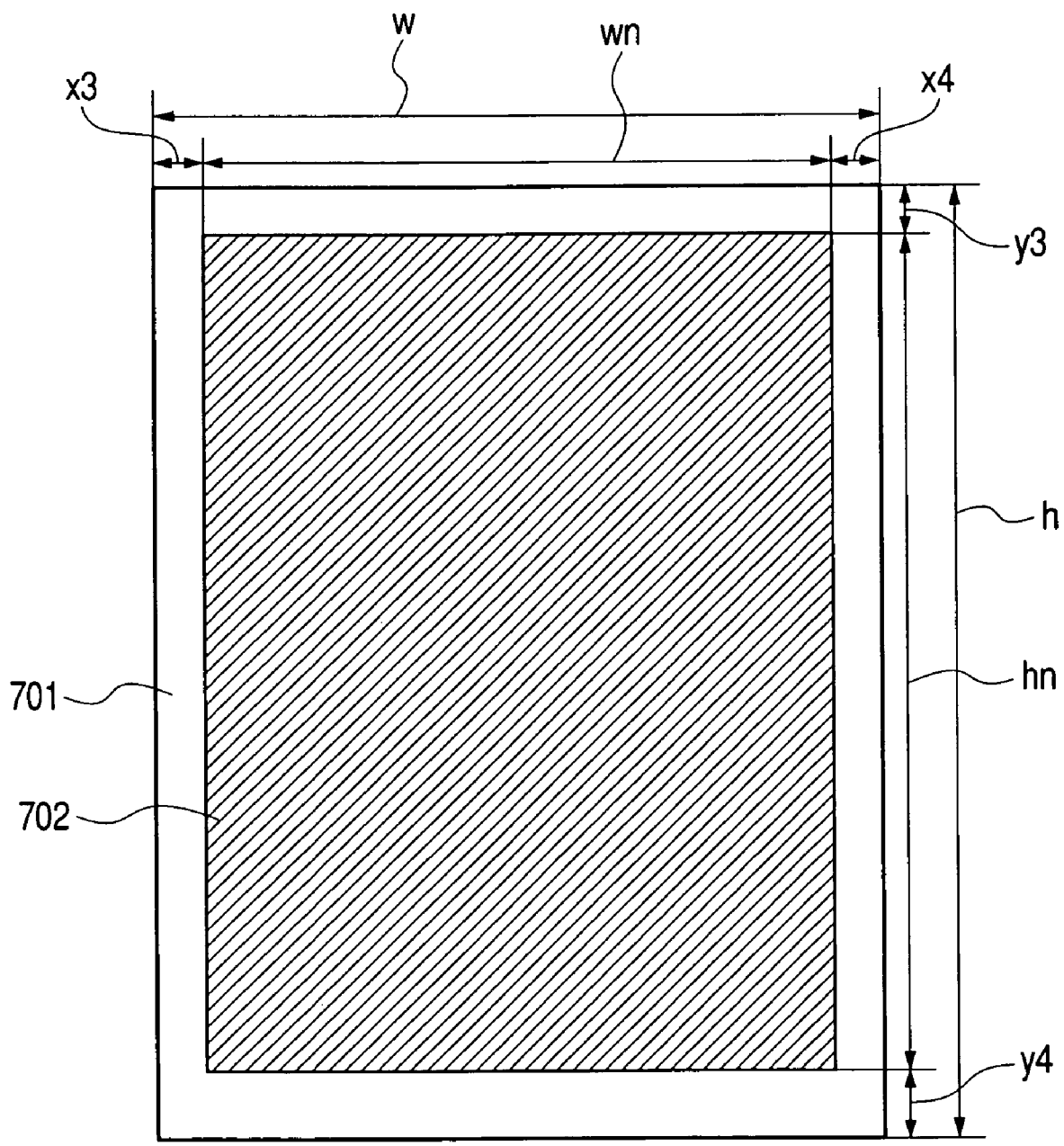
FIG. 8 is a diagram for explaining a valid print area of image data upon "bordered" printing in the printing apparatus according to the invention.

FIG. 8 is a diagram for explaining a valid print area of image data upon "bordered" printing (printing with a border) in the printing apparatus according to the invention.

In FIG. 8, when the bordered printing is executed, with respect to a real size 701 of the recording medium having a width w (mm) and a length h (mm), drawing is executed to a printable range 702 of a width wn (mm)=w−x3−x4 and a length hn (mm)=h−y3−y4 in which a left margin x3 (mm), a right margin x4 (mm), a front edge margin y3 (mm), and a rear edge margin y4 (mm) which have been predetermined on the basis of cutting precision of the recording medium, the conveying precision of the printer, conditions on the printer mechanism, and the like are left in the peripheries.

Real size information of the recording medium, margin information of the four peripheries, and real resolution r (dpi) of the printer are transmitted from the printer driver 110 to the application 116.

When the bordered printing is executed, a bit map image of a lateral width xn×r/25.4 (dots) and a longitudinal length hn×r/25.4 (dots) is formed and the image recording according to it is executed.

Figure 9:
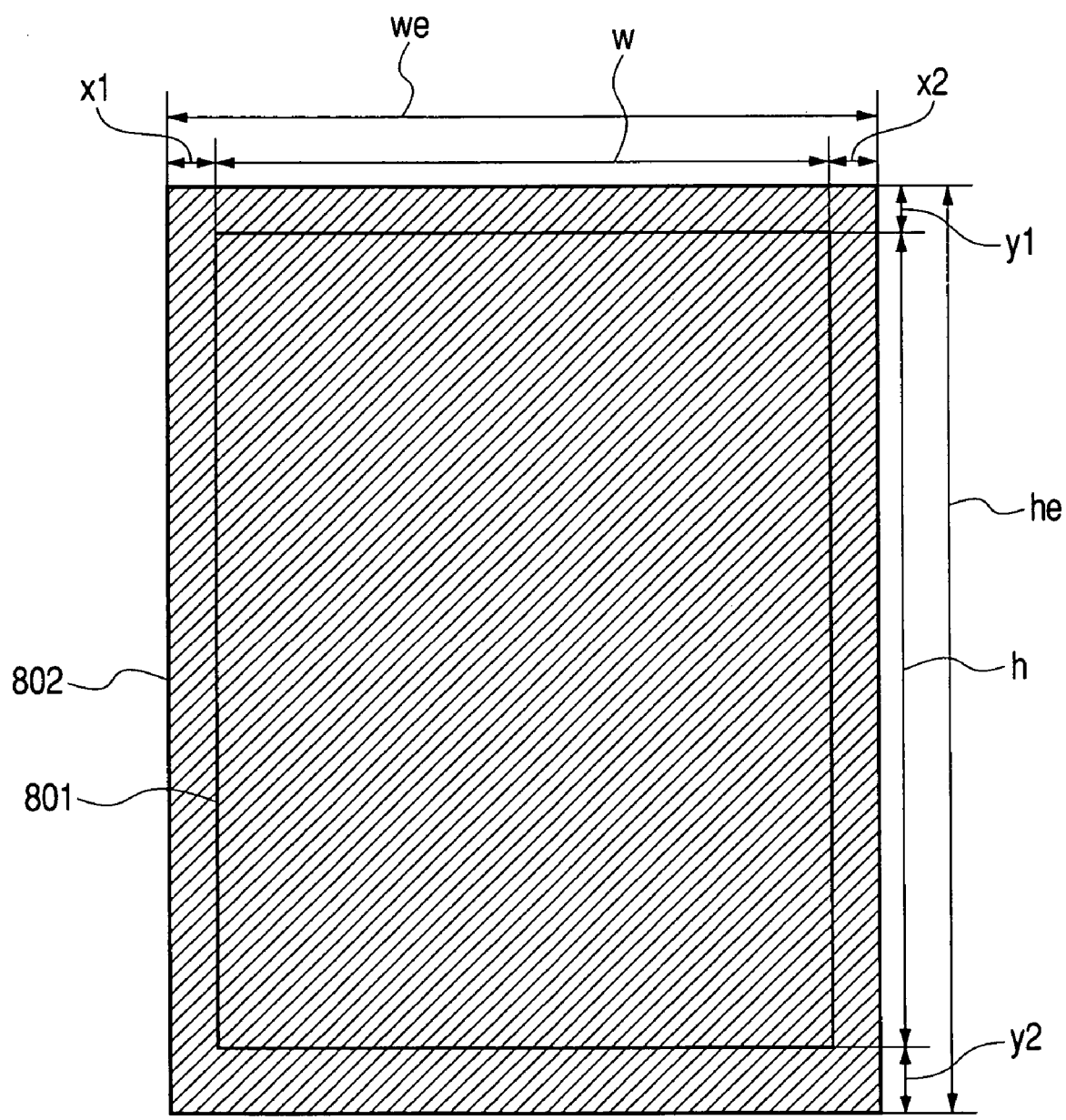
FIG. 9 is a diagram for explaining a valid print area of image data upon "borderless" printing in the printing apparatus according to the invention.

FIG. 9 is a diagram for explaining a valid print area of image data upon "borderless" printing in the printing apparatus according to the invention.

In FIG. 9, since the image recording is executed to a range wider than a real size 801 of the recording medium when the "borderless" printing is executed as mentioned above, it is necessary to form image data 802 larger than the real recording medium size at the real resolution of the printer. With respect to the width w (mm) of the recording medium, a left lapping amount x1 (mm) and a right lapping amount x2 (mm) which have been determined on the basis of the cutting precision of the general recording medium, the conveying precision of the printer, and the like are defined. A value of we (mm)=x1+w+x2 is needed as a minimum width of the image.

With respect to the length h (mm) of the recording medium, in a manner similar to the above, a length he (mm)=y1+h+y2 is obtained on the basis of a front edge lapping amount y1 (mm) and a rear edge lapping amount y2 (mm) which have been defined. Assuming that the resolution of the printer is equal to r (dpi), in order to execute the "borderless" printing, it is necessary to form a bit map image of a lateral width we×r/25.4 (dots) and a longitudinal length he×r/25.4 (dots).

The application 116 on the PC 102 performs layout setting on the basis of the sheet size, the resolution information which is notified from the printer driver 110, and the margin width information of the four peripheries and executes the drawing process that is optimum to them.

Upon "borderless" printing, although all margin widths of the four peripheries are equal to 0 mm, the application 116 performs the layout by using the real width w (mm) and the real length h (mm) of the recording medium as sheet size information and does not perform the layout using a width we (mm) and a length he (mm) which are different from them.

Therefore, in order to form the draw information as a bit map of the number of dots, the resolution information which is notified from the printer driver 110 to the application 116 is corrected from the real resolution r (dpi).

The corrected virtual resolution is obtained by rx' (dpi)=rx (we/w) in the lateral direction and ry' (dpi)=rx (he/h) in the longitudinal direction However, if correction ratios in lateral and longitudinal directions are different, an aspect ratio of a final output result becomes incorrect. Therefore, a larger one of the values of rx' and ry' is selected and used as virtual resolution r' (dpi) in both of the lateral and longitudinal directions and notified to the application.

By executing the above processes upon "borderless" printing, the image which is recorded onto the recording medium is stretched larger than the image arranged by the application by the user and four peripheral portions of the original data lap from the recording medium. Although it is prevented that margins occur on the four peripheries of the recording medium, a part of the data formed by the user is lost at the same time.

Therefore, in the print setting of the printer driver 110, the lapping amounts can be adjusted by adjusting the values of x1, x2, y1, and y2 step by step.

Although no problem will occur even if x1, x2, y1, and y2 are set to "0" mm, in this case, there is a possibility that a portion where no image is recorded occurs in a part of the peripheries of the recording medium due to a problem of precision.

Also in this case, naturally, it is necessary to form a bit map image larger than that upon bordered printing in which the margins of x3, x4, y3, and y4 are assured in the peripheries as mentioned above.

Although the above arithmetic operating processes are executed by the print setting processing unit 111 of the printer driver 110, the constants x1, x2, y1, and y2 are held in the print setting processing unit 111.

FIG. 10 is a diagram showing a relation between groups of sheets which can be discriminated by the media sensor 104 shown in FIG. 1 and the sheets included in the group.

In FIG. 10, a group column shows names of the groups such as Groups G1 to G6 obtained by dividing the group to be discriminated. A sheet type column shows a name of type of the sheets included in each group. Those sheet types are the names which can be selected by the sheet type selecting portion 1110 on a print setting display screen, which will be explained hereinafter in FIG. 12.

For example, Group G3 is a group of the sheets of the glossy paper type. Glossy paper, a photograph sheet, and a high quality photograph sheet are included in this group. The reason why a plurality of types of sheets are included in one group is because since the precision of the media sensor 104 is not so high as mentioned above, although Groups G1 to G6 can be correctly discriminated, a plurality of types of sheets included in the respective groups cannot be accurately and precisely discriminated.

Group G6 is a group showing a state at the time when the state where the recording medium 100 is not set in the printer 101 is detected by the media sensor 104. The sheet does not belong to this group. Contents of this table have been stored into the sheet discriminating table 115 shown in FIG. 1 (they can be also stored into the printer 101 and loaded upon initialization).

FIG. 11 is a diagram showing a relation between the groups or the sheets in the data processing apparatus 102 shown in FIG. 1 and a color conversion table adapted to them.

In FIG. 11, the names of the tables (table names stored in the color conversion table 113 shown in FIG. 1) for the color converting process which is executed when the print data is formed are described in the color conversion table column.

In dependence on the sheet type, there is a case (plain paper corresponds to such a case) where the different color conversion is executed upon bordered printing and "borderless" printing because of such a reason that if the "borderless" printing is executed by the same ink injection amount as that used at the time of the bordered printing, an inconvenience occurs due to the curled sheet, or the like.

Consequently, since there is a case where the color conversion table which is used differs at the time of the bordered printing and the "borderless" printing, the names of the tables which are used in the respective cases are described. The color conversion table for the "borderless" printing is not defined for the type of sheet which is improper for the "borderless" printing (the coated paper, glossy film, OHP film, and Groups G4 and G5 correspond to such a case).

The names of the groups or the sheets shown in FIG. 10 are described in the group or sheet column and the color conversion table that is optimum to each group or each sheet type is defined.

For example, the color conversion table that is optimum to "photograph sheet" is a "table for photograph sheet" which is common in the bordered printing and in the "borderless" printing. This table is a color conversion table which has been tuned so as to obtain the best print result in the case where the recording medium 100 is the photograph sheet.

The color conversion table that is optimum to Group G3 is also the table for the photograph sheet. This table for photograph sheet is a table selected so as to obtain the print result suitable for the sheet irrespective of the type of the recording medium 100 such as glossy paper, photograph sheet, or high quality photograph sheet.

When considering the case where the recording medium 100 is the glossy paper, print quality which is obtained in the case of using the color conversion table for the glossy paper is higher than that in the case of using the color conversion table for the photograph sheet.

As mentioned above, when a plurality of types of sheets are included in the group, the color conversion table that is optimum to this group does not provide the best print result to all of those sheets. The contents of this table have been stored in the color conversion table 113 shown in FIG. 1.

FIG. 12 is a diagram showing an example print setting dialog which is displayed on a display unit provided for the set information notifying unit 119 of the data processing apparatus 102 shown in FIG. 1 and corresponds to an example of the print setting dialog which is displayed, for example, when the print mode or various sheet settings are performed.

In FIG. 12, reference numeral 1101 denotes the print setting dialog constructed by display areas 1102 to 1116. Since the number of items to be displayed is very large in the print setting, the set items are generally classified every contents by using a tab sheet so as to be easily seen. A tab is also used in the embodiment.

Reference numeral 1102 denotes a fundamental setting tab for displaying the contents about the whole printing. Details will be explained hereinafter.

Reference numeral 1103 denotes a color setting tab for displaying the contents about the color processing setting and fine adjustment of a color tone according to the output contents for a natural image, graphics, or the like. At the same time, the color setting tab 1103 receives a change instruction of the set contents and an input from the user.

Reference numeral 1104 denotes a special effect tab for displaying a selecting display screen of functions which are used in the case where a special effect such as various image corrections, sepia tone, or the like is applied to the image. Reference numeral 1105 denotes a utility tab for displaying a selecting display screen of functions such as adjustment, cleaning, and the like of the head.

Reference numeral 1106 denotes a simple display area for the whole setting. The set information is displayed in this area not only in a form of character information but also in a form of a visual image.

Reference numeral 1107 denotes a display/operation area of the sheet type. This area is used for displaying or operating the set sheet type and constructed by an auto radio button 1108, a manual setting radio button 1109, and the sheet type selecting portion 1110.

The radio buttons 1108 and 1109 are in the state where only either of them has always been selected. When the radio button 1108 is selected, the sheet type detecting function by the media sensor 104 is validated and the printing process suitable for the detected sheet type is executed. At this time, the sheet type selecting portion 1110 is displayed in a pale color and cannot be operated. The processing operation of the data creation processing unit 112 in this case will be described hereinafter with reference to FIG. 16.

In the dialog shown in FIG. 12, when the radio button 1109 is selected, the sheet type selecting portion 1110 is validity-displayed, so that the sheet type selection by the user operation is validated. At this time, the sheet type detecting function is invalidated and the optimum printing process is executed in correspondence to the sheet type selected by the sheet type selecting portion 1110. Since the data forming process and the printing operation in this case are equivalent to those of the general ink jet printer having the normal "borderless" printing function, their detailed explanation is omitted.

The sheet type selecting portion 1110 is a field where the sheet type is displayed and can be selected by the user. The sheet types described in the group or sheet column shown in FIG. 10 are prepared as selection items. The group names are not displayed.

A sheet size selecting portion 1111 is a field where the size of the recording medium 100 is displayed and can be selected by the user. Although "A4, A5, B5, postcard, L size, and 2L size (there is a case where it differs in accordance with a market district of the products)" are included-as—selection—items, other items can be included.

A "borderless" printing check box 1112 displays whether the "borderless" printing is executed or not. When the user checks this box, the validity or invalidity of the "borderless" printing is designated.

When the manual setting radio button 1109 is selected and the sheet type which does not correspond to the "borderless" printing is selected by the sheet type selecting portion 1110, the check box 1112 is displayed in a pale color, the user operation is invalidated, and the printing process is executed in the bordered print setting.

The sheet type which does not correspond to the "borderless" printing denotes the type of sheet in which the color conversion table column upon "borderless" printing shown in FIG. 11 is a blank column (the coated paper, glossy film, and OHP film shown in FIG. 10 correspond to this type). In the other cases, the check box 1112 is validity-displayed.

If the check box 1112 is checked when it is validity-displayed, the printing process is executed in the "borderless" print setting.

That is, this means that if the check box 1112 to designate the "borderless" printing is checked in the state where the auto radio button 1108 has been selected (the sheet type "auto"), the printing process is executed in the "borderless" print setting.

A lapping amount setting slide bar 1113 upon "borderless" printing displays the lapping amount in the "borderless" printing mentioned in FIG. 9, and the user designates a desired lapping amount. As a lapping amount in the "borderless" printing, a specific numerical value is not designated but one of the four amounts "none, small, middle, large" is selected.

The slide bar 1113 is validity-displayed and can be operated only when the check box 1112 to designate the "borderless" printing is validity-displayed and checked. The slide bar 1113 is displayed in a pale color and cannot be operated in the other cases.

Reference numeral 1114 denotes an OK button. When this button is clicked, the print setting selected on the print setting dialog 1101 is stored and, thereafter, the print setting dialog 1101 is closed.

Reference numeral 1115 denotes a cancel button. When this button is clicked, the print setting selected on the print setting dialog 1101 is returned to the state before the change and, thereafter, the print setting dialog 1101 is closed.

Reference numeral 1116 denotes a help button which displays a help regarding various print settings which are managed by the printer driver 110.

Although not disclosed here, an update button for updating the selection contents of the print settings and storing them can be also added.

As mentioned above, the print setting dialog 1101 has a display screen construction in which items necessary to the user are collectively displayed, so that the user can momentarily confirm the contents of the print settings which have been made.

By selecting the auto radio button 1108 shown in FIG. 12, the setting regarding the sheet type of the print setting is automated.

Figure 13:
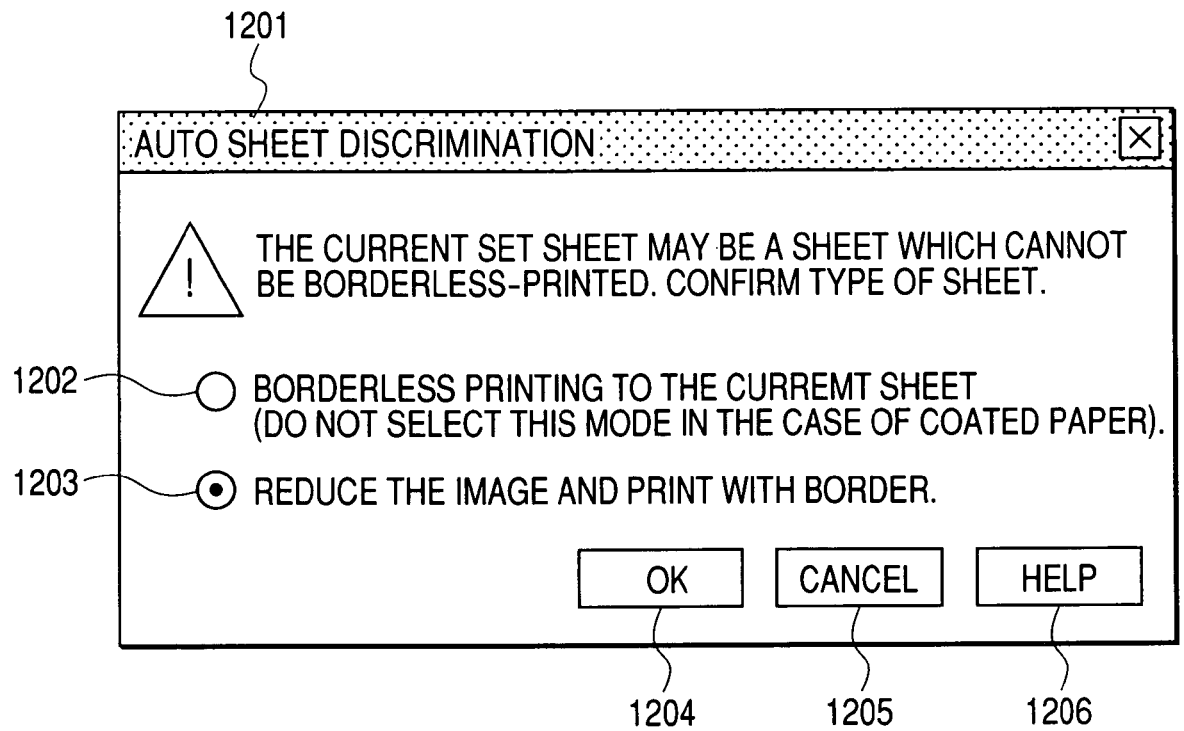
FIG. 13 is a diagram showing a first mismatch error dialog in the data processing apparatus according to the invention.

FIG. 13 is a diagram showing a first mismatch error dialog in the data processing apparatus according to the invention. This dialog is displayed in the case where in spite of the setting of the "borderless" printing at the time of a print data forming process, which will be explained hereinafter, the sheet type group in which the "borderless" printing may be impossible is detected as a sheet type of the recording medium 100.

Specifically speaking, the sheet type group in which the "borderless" printing may be impossible denotes Group G2 in FIG. 10. Although two types of sheets such as coated paper and mat paper for photograph are-included in Group G2, as shown in FIG. 11, the coated paper corresponds to "cannot be borderless-printed" and the mat paper for photograph corresponds to "can be borderless-printed." Therefore, if the discrimination result of the sheet type indicates Group G2, the "borderless" printing may be impossible.

In this case, a dialog 1201 as shown in FIG. 13 is displayed in the set information notifying unit 119 shown in FIG. 1, thereby urging the user to execute the inputting operation.

FIG. 13 is a diagram showing an example of a print setting dialog which is displayed in a display unit equipped for the set information notifying unit 119 of the data processing apparatus 102 shown in FIG. 1. Radio buttons 1202 and 1203 are provided for designating the printing method.

When the radio button 1202 is selected in FIG. 13, the processes are continued in the state of the "borderless" print setting as it is. When the radio button 1203 is selected, the processes are continued as bordered printing.

Reference numeral 1204 denotes an OK button. When this button is selected, the printing process is continued by the method designated by the radio button 1202 or 1203.

Reference numeral 1205 denotes a cancel button. When this button is selected, the printing is stopped irrespective of the designation of the radio button 1202 or 1203. Reference numeral 1206 denotes a help button which displays a help regarding the dialog 1201.

Figure 14:
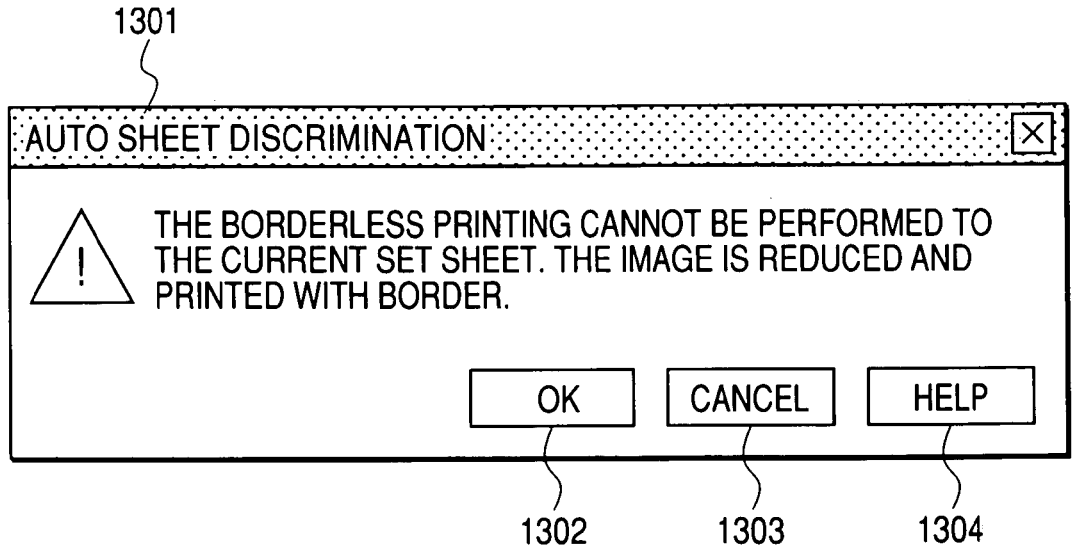
FIG. 14 is a diagram showing a second mismatch error dialog in the data processing apparatus according to the invention.

FIG. 14 is a diagram showing an example of a print setting dialog which is displayed on a displaying apparatus equipped for the set information notifying unit 119 in the data processing apparatus 102 shown in FIG. 1. This dialog corresponds to a second mismatch error dialog. This display screen is displayed in the case where in spite of the fact that the "borderless" printing has been set at the time of the print data forming process, which will be explained hereinafter, the sheet type group in which the "borderless" printing cannot be executed is detected as a sheet type of the recording medium 100.

In FIG. 14, specifically speaking, the sheet type group in which the "borderless" printing (whole surface printing) cannot be executed denotes Groups G4 and G5 in FIG. 10. Although the glossy film and the OHP film are included in Groups G4 and G5, respectively, the "borderless" printing cannot be executed in both groups as shown in FIG. 11. Therefore, if the discrimination result of the sheet type indicates Group G4 or G5, the "borderless" printing cannot be executed.

In this case, a dialog 1301 shown in FIG. 14 is displayed, thereby urging the user to execute the inputting operation.

Reference numeral 1302 denotes an OK button. When this button is selected, the printing process is continued in the bordered print setting. Reference numeral 1303 denotes a cancel button. When this button is selected, the printing is stopped. Reference numeral 1304 denotes a help button which displays a help regarding the dialog 1301.

That is, there is the following different point between the dialog shown in FIG. 13 and the dialog shown in FIG. 14. When the group in which the sheets which can be "borderless" printed and the sheets which cannot be "borderless" printed exist mixedly is detected by the media sensor 104, the dialog shown in FIG. 13 is displayed and the user is notified that an inconvenience occurred in a print request to Group G2 which cannot be discriminated by the auto sheet type discriminating function, so that the user can select either a mode for avoiding the execution of the "borderless" printing or a mode for forcedly executing the "borderless" printing.

On the other hand, in the case of the dialog shown in FIG. 14, when Group G4 or G5 is detected by the media sensor 104, since such a group relates to the sheets whose "borderless" printing is inherently inhibited, the bordered printing is executed, thereby preventing the occurrence of the inconvenience due to the execution of the "borderless" printing.

Figure 15:
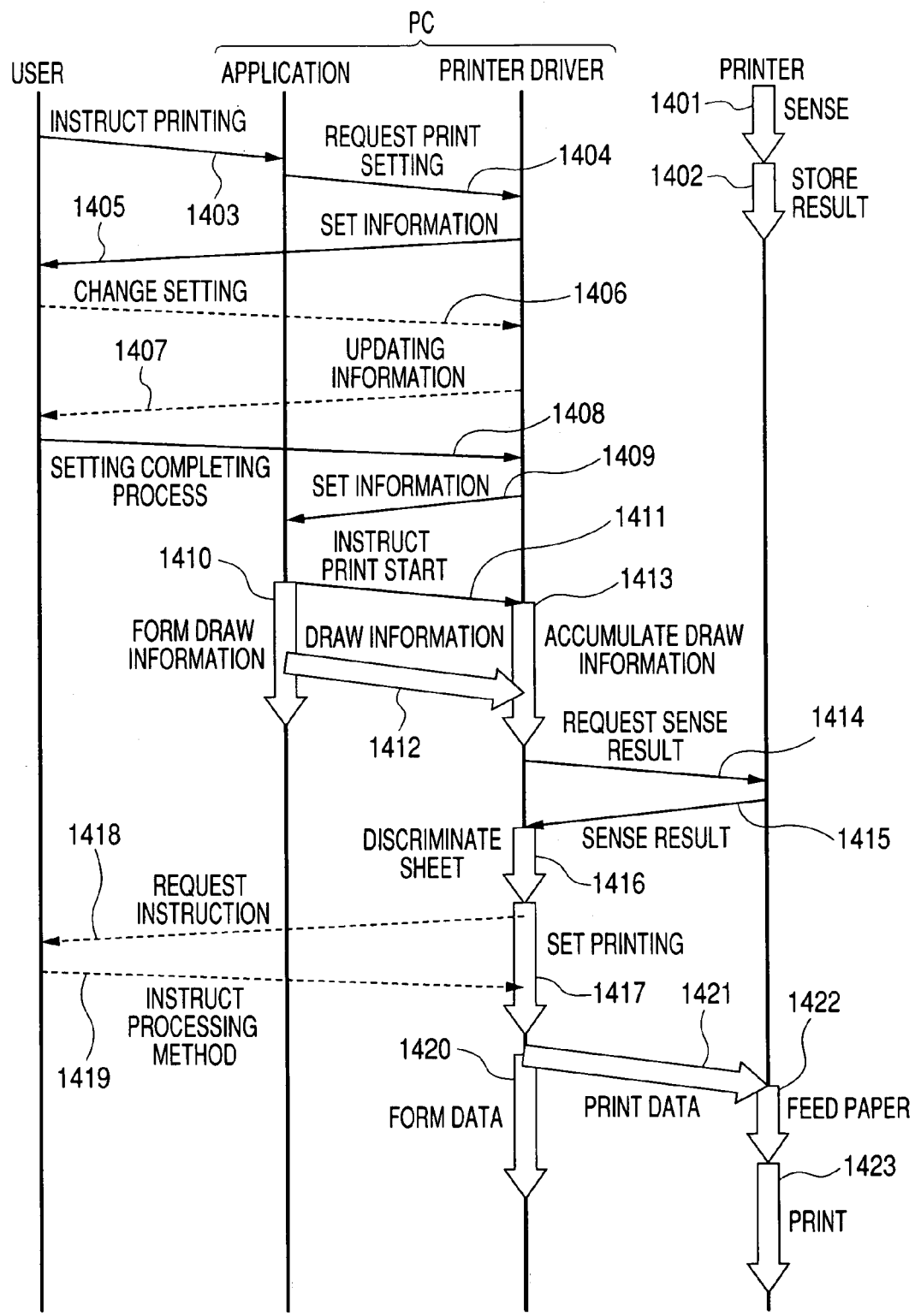
FIG. 15 is a chart for explaining a flow of a series of data processes which are associated among an application, a printer driver, and the printer in the printing system according to the invention.

FIG. 15 is a chart for explaining a flow of a series of data processes which are associated among the application, the printer driver, and the printer in the printing system according to the invention. This chart corresponds to an example of a sequence for the data processes of the user, the application 116, the printer driver 110, and the printer 101 regarding the "borderless" printing process. Explanation will be made on the assumption that reference numerals 1401 to 1423 denote processing steps (procedure).

In step 1401, the printer 101 obtains the information for specifying the sheet type of the stacked recording media 100 by the media sensor 104.

It is assumed that the media sensor 104 is attached so that it can sense the type of sheets stacked on the paper feed tray, sheet feeder, or exclusive cassette and it can sense the sheet type before the sheet is fed.

The sensing timing of the media sensor 104 can be set to any timing so long as the media sensor 104 can respond obtained information when the printer driver 110 requests to obtain sheet information. Although it is now assumed that the sensing timing is set to the time of turn-on of the power source of the printer 101, for example, it is also possible to use such a construction that the sheet type is immediately sensed at the time of the obtaining request from the printer driver 110.

In step 1402, the output result of the media sensor 104 is stored into the sense information storing unit 105.

In step 1403, the user instructs the print request to the applications 116 on the PC 102. Generally, the print request is instructed by executing a print command in a menu of the applications 116 which are used. It is instructed by using a mouse and a keyboard (provided for the print setting input operation unit 118 shown in FIG. 1). Such an instruction can be also realized through a voice input instead of pointing devices such as keyboard, mouse, and the like.

In step 1404, the application 116 requests the printer driver 110 to make the print setting. Generally, it is performed by activating the printer driver 110 through an application program interface (API) which is provided by the OS.

In step 1405, in response to the instruction of the print setting request, the print setting processing unit 111 of the printer driver 110 displays the predetermined print set information by using a display apparatus such as a monitor or the like (provided for the set information notifying unit 119 shown in FIG. 1).

In step 1406, the user confirms the print set information displayed in step 1405 and a print setting change instruction is received as necessary. In this case, the updated set information is displayed in step 1407. The processes of steps 1406 and 1407 are executed at an arbitrary number of times over "0" time in accordance with the operation of the user.

In step 1408, the printer driver receives a setup completion instruction from the user. If the user directly starts the printing without displaying the print setting display screen from the application 116 which is being operated on the PC 102, step 1409 and subsequent steps are executed in the predetermined print settings as they are without executing steps 1405 to 1408.

In step 1409, the set information which is used at the time of the printing process is transferred to the application 116 from the print setting processing unit 111 of the printer driver 110. The information such as sheet type, sheet size, print resolution, and the like is included in the set information. After that, the actual printing process is started.

In step 1410, the application 116 forms draw information of the image which the user wants to print in accordance with the print settings obtained from the printer driver 110. First, in step 1411, a print start instruction is sent to the printer driver 110 and, subsequently, the formed draw information is successively sent to the printer driver 110 in step 1412.

In step 1413, the data creation processing unit 112 of the printer driver 110 once accumulates (spools) the draw information transferred from the application 116 into a temporary file (not shown). There is also a case where such an operation is executed by the OS.

In step 1414, the sheet specifying processing unit 114 of the printer driver 110 issues a sense result obtaining request through the I/F control unit 109 in order to confirm the type of sheets stacked in the printer 101.

Subsequently, in step 1415, the printer 101 returns the already obtained media sense result to the printer driver 110 on the PC 102 in response to the obtaining request. If the media sensing operation can be executed for a short time as mentioned above, it is also possible to construct in such a manner that after the reception of the obtaining request in step 1414, the media sensing operation in step 1401 and the storage of the sense result in step 1402 are executed, and thereafter, the sense result is immediately returned in step 1415.

In step 1416, the sheet specifying processing unit 114 of the printer driver 110 discriminates the sheet type by using the sheet discriminating table 115 on the basis of the sense result returned in step 1415.

In step 1417, the print setting processing unit 111 makes the final print setting on the basis of the already set print settings and the discrimination result of the sheet type in step 1416. At this time, if there is a mismatch between the setting on the printer driver 110 side and the sheet discrimination result, the user is notified of the mismatch through the set information notifying unit 119 in step 1418. The user executes the instructing operation through the print setting input operation unit 118 in step 1419.

By receiving the final print setting of step 1417, the data creation processing unit 112 forms the print data which can be interpreted by the printer 101 in step 1420. The print data is successively transmitted to the printer 101 through the I/F control unit 109 in step 1421.

The printer 101 which received the print data as mentioned above feeds the recording medium 100 from the sheet feeder, paper feed tray, or cassette in step 1422 and prints in step 1423.

Figure 16B:
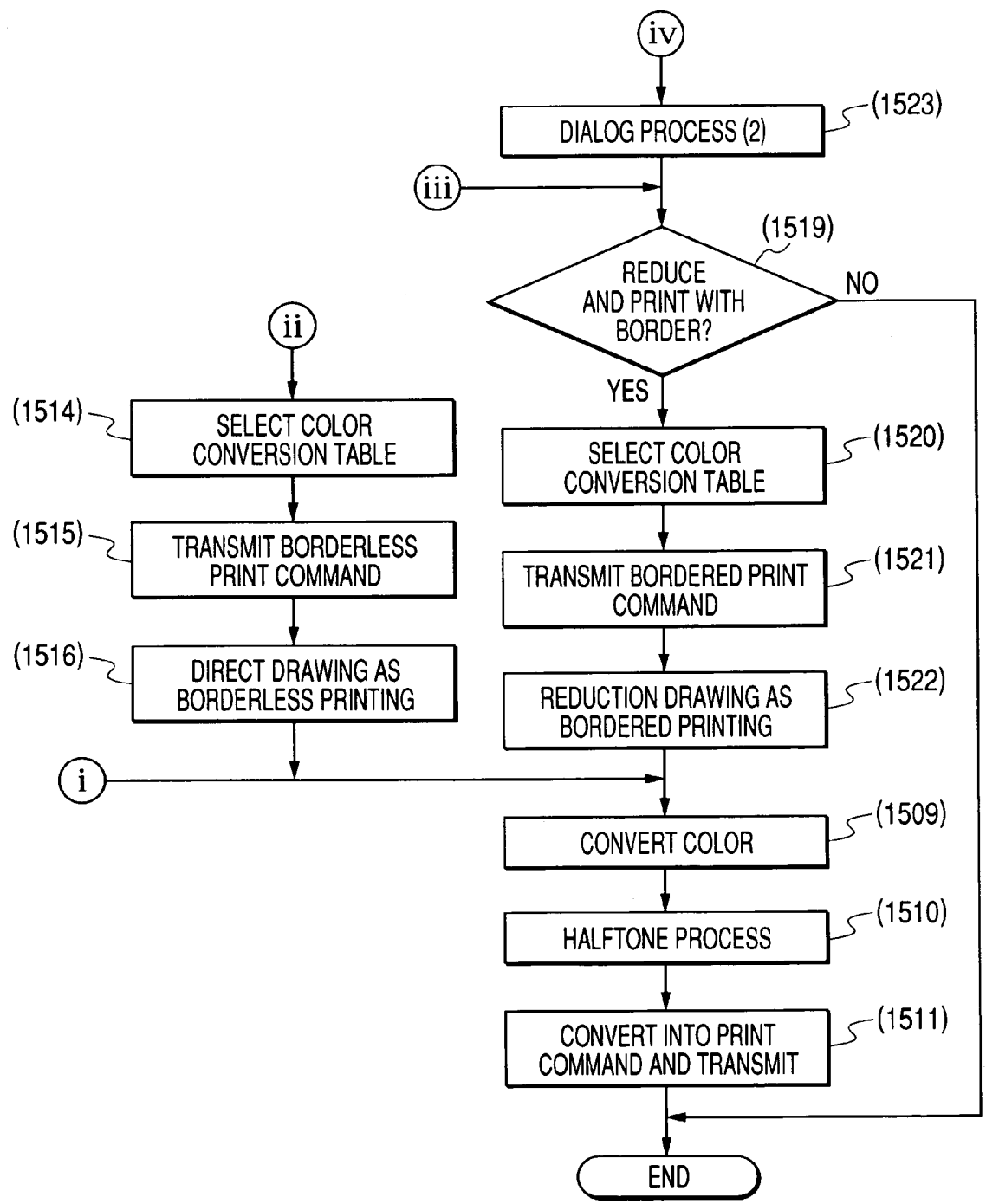
FIG. 16 is comprised of FIGS. 16A and 16B showing flowcharts for explaining an example of a first data processing procedure in the data processing apparatus according to the invention.

FIGS. 16A and 16B are flowcharts for explaining an example of a first data processing procedure in the data processing apparatus according to the invention and corresponds to a detailed procedure for the print processing operation of the printer driver 110 in steps 1413 to 1420 in FIG. 15. Reference numerals 1501 to 1523 denote processing steps, respectively.

First, the draw information sent from the application 116 is accumulated into a temporary file (accumulated into a file in a hard disk (not shown)) (1501). This step corresponds to step 1413 shown in FIG. 15. The draw information has been formed on the basis of the print set information transferred from the printer driver 110 to the application 116 in step 1409 shown in FIG. 15.

Therefore, in the case of the "borderless" printing, the draw information is transferred by coordinates regarding the whole surface 801 of the real recording medium as a target at the corrected virtual resolution r'.

In the case of the bordered printing, the draw information is transferred by coordinates regarding the inside of the printable range 702 as a target at the real resolution r of the printer 101. Although the character information, the graphics information such as diagrams or the like, and the image information such as a bit map or the like are included in the draw information, the draw information is not limited to them.

Subsequently, the media sense result is requested from the printer 101 (1502), thereby obtaining the sense result (1503). On the basis of the sense result, the media group is discriminated (which one of Groups G1 to G6 shown in FIG. 10) (1504). Those processes correspond to those of steps 1414 to 1416 shown in FIG. 15.

Subsequently, whether or not the "borderless" printing has been designated on the dialog display screen shown in FIG. 12 by the user in the current print setting (whether the check box 1112 has been checked or not) is discriminated (1505). If it is determined that the "borderless" printing has been designated, the processing routine branches to step 1512.

If it is determined in step (1505) that the "borderless" printing is not designated, the normal drawing process is executed. That is, the color conversion table for the bordered printing of the media group according to a discrimination result of step 1504 is selected (1506). The print start command of the bordered print setting is formed and transmitted to the printer 101 (1507). In the bordered print setting, an image is drawn in a buffer assured in the memory on the basis of the draw information accumulated in step 1501 (1508).

After that, the color converting process is executed to the image drawn in the buffer by using the color conversion table which has already been selected (1509). A halftone process according to the print settings is executed (1510). The image in which the halftone process has been executed is converted into a data format that is peculiar to the printer 101 and sequentially transmitted to the printer 101 through the I/F control unit 109 (1511). A series of printing processes are finished.

If the "borderless" printing has been designated in step 1505, first, whether or not the media group determined in step 1504 is a group (Groups G4, G5) in which the "borderless" printing cannot be executed at all is discriminated (1512).

Specifically speaking, whether or not all of the media belonging to the group relate to Groups G4 and G5 shown in FIG. 10 which do not correspond to the "borderless" printing is discriminated. If it is determined in step 1512 that the group relates to the media group in which the "borderless" printing cannot be executed, the processing routine branches to step 1523.

If it is determined in step 1512 that the media are not the media in which the "borderless" printing cannot be executed, whether or not the group relates to the media group in which the "borderless" printing may be impossible (Group G2 having a possibility that the "borderless" printing can be executed) is discriminated (1513).

Specifically speaking, Group G2 shown in FIG. 10 in which both of the media corresponding to the "borderless" printing and the media which do not correspond to the "borderless" printing are included in the media belonging to the group corresponds to such a media group. In the case of the media group in which the "borderless" printing may be impossible, the processing routine branches to step 1517.

If it is determined in step (1513) that the group is the media group in which the "borderless" printing can be executed, the color conversion table for the "borderless" printing of the media group according to the discrimination result of step 1504 is selected in accordance with the table of FIG. 11 (1514). The print start command for the "borderless" print setting is formed and transmitted to the printer (1515). The image is drawn into the buffer assured in the memory in the "borderless" print setting on the basis of the draw information accumulated in step 1501 (1516).

After that, step 1509 follows and processes in steps (1509 to 1511) are executed in a manner similar to that mentioned above. That is, color conversion, halftone process, conversion into a print command, and transmission of the print command are executed. A series of printing processes is finished.

When the processing routine branches to step 1517 from step 1513, the dialog box shown in FIG. 13 is displayed onto the monitor (displaying apparatus provided for the set information notifying unit 119 shown in FIG. 1) and the apparatus receives the button selection instructing operation from the user (1517).

Whether or not the user has selected a mode "Borderless printing to the current sheet" is discriminated (1518). If it is determined that the user has selected the mode "Borderless printing to the current sheet," step (1514) follows and the processes upon normal "borderless" printing are executed.

If it is determined in step (1518) that the user has not selected a mode "Borderless printing to the current sheet," the processing routine further advances to step (1519). Whether or not the user has selected a mode "Reduce the image and print with border" is discriminated. If it is determine that the user has selected the mode "Reduce the image and print with border," the color conversion table for the bordered printing of the media group according to the discrimination result of step (1504) is selected in accordance with the table shown in FIG. 11 (1520) The print start command of the bordered print setting is formed and transmitted to the printer (step 1521).

The drawing process into the buffer assured in the memory is executed on the basis of the draw information accumulated in step (1501). In this instance, by converting a drawing position and a size, the image information is reduced and a reduced image is drawn in a printable area in the bordered print setting.

Specifically speaking, "sx=wn/we" and "sy=hn/he" are calculated on the basis of "wn and hn" shown in FIG. 8 and "we and he" shown in FIG. 9, respectively, and a reducing process in which the smaller one of "sx" and "sy" is set to a reduction ratio is executed (step 1522). After that, the color conversion, halftone process, conversion into the print command, and transmission of the print command are executed in step 1509 and subsequent steps.

When the user selects "cancel," the printing process is finished at that point of time. Thus, the printing is cancelled.

When the processing routine branches to step (1523) from step (1512), the dialog box shown in FIG. 14 is displayed onto the monitor and the apparatus receives the button selecting operation from the user (1523).

Whether or not the user has selected a mode "Reduce the image and print with border" is discriminated. If it is determined that the user has selected "OK," step (1520) follows. In order to execute the bordered printing of the reduced image, steps (1520) to (1522) and steps (1509) to (1511) are executed. If the user selects "cancel," the printing is finished at that point of time.

As described above, according to the first embodiment, the type of recording medium 100 is discriminated and the setting is properly performed by the functions of the media sensor 104 and the sheet specifying processing unit 114. Therefore, the printing in the proper settings can be automatically executed even for the user who does not have enough knowledge of the setting of the sheet type without executing the complicated operation such as setting of the sheet type.

Since the processing routine branches to step (1512) and step (1513) shown in FIG. 16, it is prevented that the "borderless" printing is executed to the type of sheet which is improper for the "borderless" printing. The damage to the printer or the wasteful consumption of the sheets which are caused by executing the "borderless" printing to such improper sheets can be avoided.

Since such discrimination is made on the basis of the result of the sheet specifying process instead of the sheet size, it is possible to cope with the difference of the conditions depending on the sheet type.

Further, by providing the reducing process in steps (1520) to (1522) as a substituting process of the "borderless" printing, the user can obtain the image output without executing the complicated operation for reprinting.

Since a natural image such as a photograph or the like is mainly presumed as a target image of the whole surface "borderless" printing, even if the image is slightly reduced for the bordered printing, a serious problem does not occur in terms of a change in image size, picture quality, or the like. An advantage of reduction of troublesomeness of the user operation can be obtained. When the substituting process is applied, there is such an effect that by displaying the dialogs (refer to FIGS. 13 and 14) to the user, the execution of the printing against the intention of the user can be prevented.

Second Embodiment

The second, embodiment to realize the invention will now be described with reference to the drawings.

Constructing elements of functional blocks of a printing system for realizing the second embodiment are fundamentally similar to those of the printing system described in the first embodiment.

Explanation of similar portions are omitted here because they have sufficiently been described in the first embodiment. Since a "borderless" printing mechanism and discrimination about the sheet type by the media sensor are also similar to those in the first embodiment and their description is also omitted-here.

It is a feature of the second embodiment that an automatic duplex (both-sides) printing mechanism is added to the simplex (one-side) printing by the printer in the first embodiment.

Figure 17:
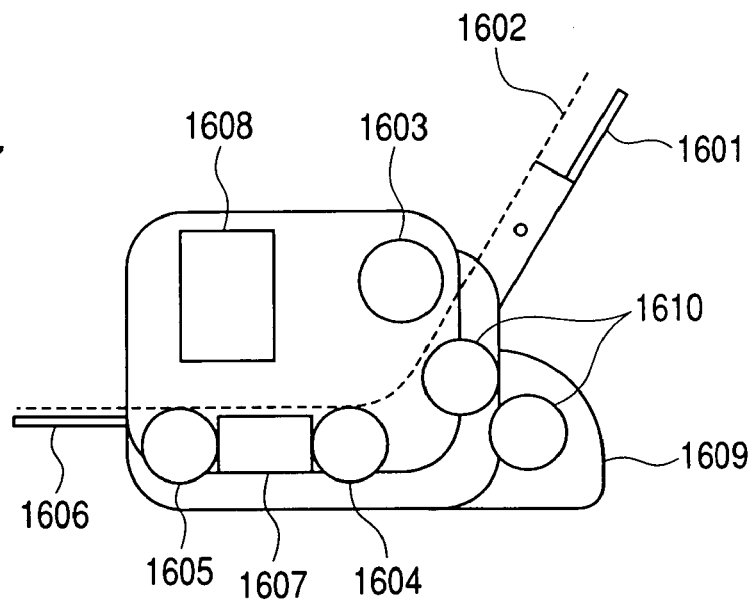
FIG. 17 is a schematic cross sectional view for explaining an example of a printing apparatus showing the second embodiment of the invention.
Figure 18:
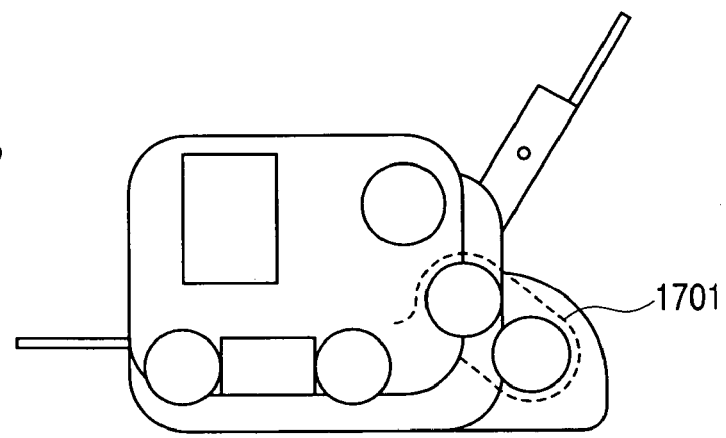
FIG. 18 is a schematic cross sectional view for explaining an example of the printing apparatus showing the second embodiment of the invention.
Figure 19:
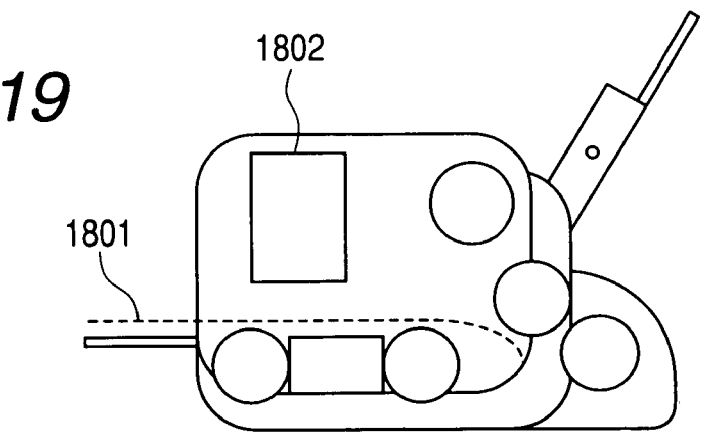
FIG. 19 is a schematic cross sectional view for explaining an example of the printing apparatus showing the second embodiment of the invention.

FIGS. 17 to 19 are schematic cross sectional views for explaining an example of a printing apparatus according to the second embodiment of the invention and correspond to an example of the printing apparatus constructed in such a manner that a reversing unit to execute the duplex printing is provided for the printing apparatus shown in FIG. 2 and a printing process can be executed to both sides of the sheet by executing a reversing process of the sheet through a reversing path.

In FIG. 17, reference numerals 1601 and 1603 to 1608 denote substantially the same component elements as the component elements 201 and 203 to 208 shown in FIG. 2 and their description is omitted here.

In FIG. 17, reference numeral 1609 denotes an auto duplex printing unit and 1610 indicates conveying rollers of the auto duplex printing unit 1609. The recording medium is reversed by using those mechanisms, thereby realizing the printing to both sides of the recording medium.

Reference numeral 1602 denotes a path of the recording medium upon printing onto the first surface of the recording medium in the printer in the second embodiment. After completion of the printing up to a rear edge of the first surface, a paper ejecting roller 1605 and the conveying rollers 1604 are conversely rotated, thereby conversely feeding the recording medium whose first surface has been printed and sending it to the auto duplex printing unit 1609. In the auto duplex printing unit 1609, the conveying rollers 1610 convey the recording medium.

A path at the time when the recording medium is conveyed in the auto duplex printing unit 1609 is shown as a conveying path 1701 in FIG. 18. The conveying path 1701 is set to be longer than the maximum length of the recording medium which can be automatically duplex-printed.

After that, the recording medium is again conveyed to a gap between the platen and the recording head in the face-down state. A conveying path of the recording medium at this time is shown as a conveying path 1801 in FIG. 19.

The ink droplets are ejected from a recording head 1802, thereby recording an image onto the second surface of the recording medium. At this time, a reverse side at a rear edge of the first surface becomes a front edge of the second surface and a reverse side at a front edge of the first surface becomes a rear edge of the second surface. Therefore, in order to arrange an upper edge of the image to the front edge of the first surface and arrange an upper edge of the image of the second surface to the reverse side, it is necessary to rotate the image on the second surface by 1800 from the first surface and record it from the lower edge toward the upper edge.

FIG. 20 is a diagram for explaining a correspondence relation between a possibility of duplex printing and a possibility of the "borderless" printing of each sheet type which are managed by the data processing apparatus according to the invention. It is assumed that the correspondence relation has been stored as a table in the sheet discriminating table 115 or the like of the data processing apparatus 102. Contents of the table shown in FIG. 20 show the fitness of the auto duplex printing and the "borderless" printing of various types of sheets in the printer.

For example, in plain paper, the "borderless" printing can be executed in the simplex print mode and the auto-duplex printing using the auto-duplex printing unit is also possible. However, when the "borderless" printing is executed in the auto duplex print mode, a fault occurs in the conveyance in the auto duplex printing unit due to a curl or a decrease in rigidity of the edge portion of the sheet. Therefore, the "borderless" printing upon auto duplex printing can be executed only to the second surface after the reversal of the recording medium but cannot be performed to the first surface. In the case of the glossy paper, the "borderless" printing can be executed to both of the first and second surfaces before and after the reversal of the recording medium. On the contrary, in the case of the coated paper, the "borderless" printing cannot be executed to both of the first and second surfaces. The auto duplex printing itself cannot be executed to the OHP film.

It is assumed that the printer of the second embodiment discriminates the sheet type of the recording media before the paper feed stacked on the sheet feeder, paper feed tray, cassette, or the like in a manner similar to the printer in the first embodiment.

Therefore, if a construction in which reflection light of specific light irradiated to the sheet is used as discriminating means, only the sheet type of the first surface of the recording medium can be discriminated. However, the printer operates on the assumption that both sides of the recording medium are made of the same kind of material.

Figure 21:
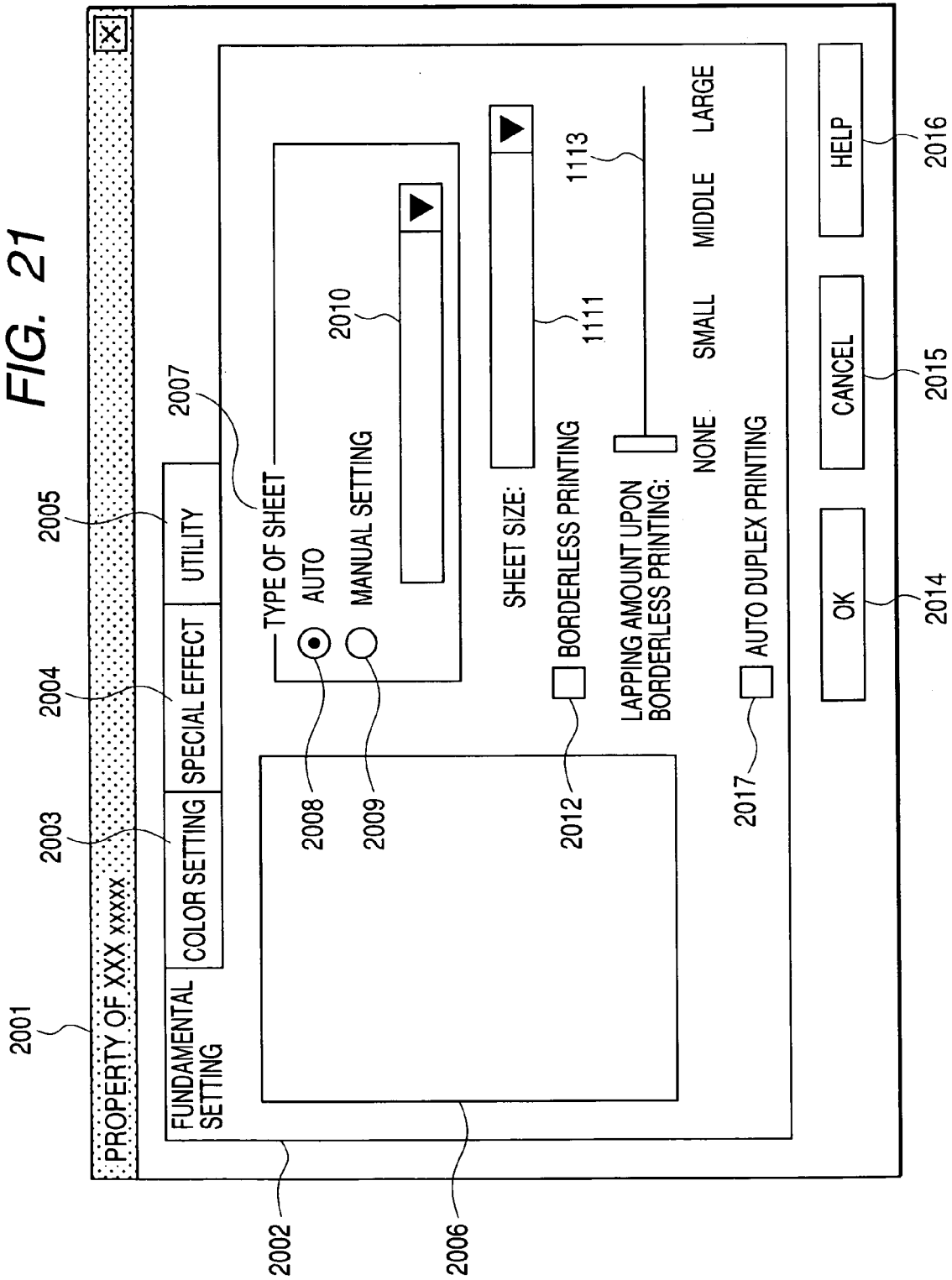
FIG. 21 is a diagram showing an example of a print setting dialog in the data processing apparatus according to the invention.

FIG. 21 is a diagram showing an example of a print setting dialog which is displayed in the data processing apparatus according to the invention and corresponds to an example of the print setting dialog which is displayed when the print mode or various sheet settings are performed in the embodiment.

In FIG. 21, since component elements 2001 and 2016 are similar to the component elements 1101 to 1116 shown in FIG. 12 in the first embodiment, their description is omitted here.

In FIG. 21, reference numeral 2017 denotes an auto duplex print check box which displays whether or not the auto duplex printing using the auto duplex printing unit is executed. When the user selects and instructs the auto duplex printing, this check box is displayed and the auto duplex print setting is validated.

Figure 22:
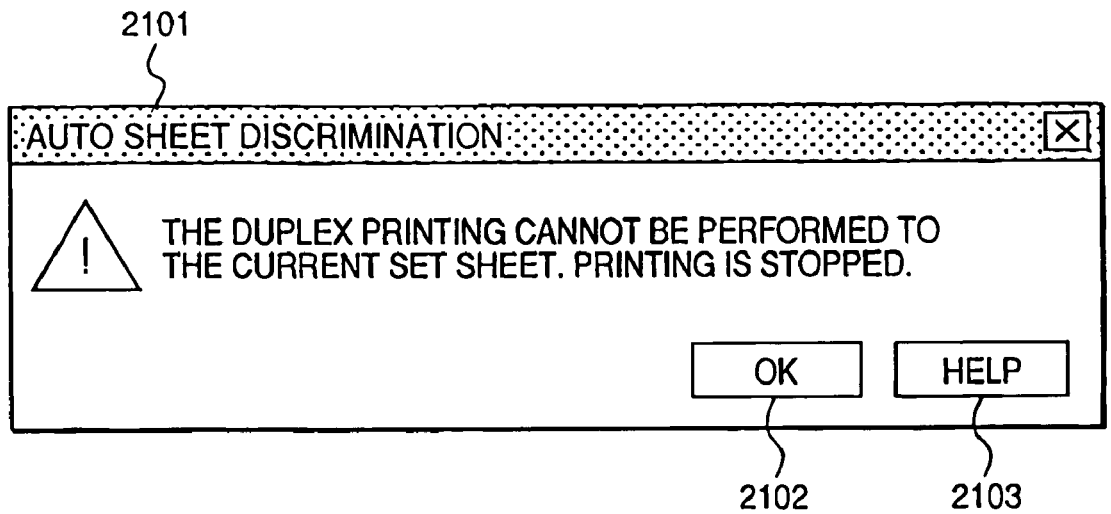
FIG. 22 is a diagram showing a third mismatch error dialog in the data processing apparatus according to the invention.

FIG. 22 is a diagram showing a first mismatch error dialog in the data processing apparatus according to the invention. This diagram is displayed on the display apparatus of the set information notifying unit 119 shown in FIG. 1.

The diagram shown as an example in FIG. 22 is displayed in the case where, at the time of a print data forming process, which will be explained hereinafter, the sheet type group which cannot be auto duplex-printed is detected as a sheet type of the recording medium 100 in spite of the setting of the auto duplex printing.

Specifically speaking, the sheet type group which cannot be auto duplex-printed corresponds to Groups G4 and G5 in FIG. 10. Although Groups G4 and G5 include the glossy film and the OHP film, respectively, those recording media do not correspond to the auto duplex printing as shown in FIG. 20. Therefore, the auto duplex printing cannot be executed if the discrimination result about the sheet type indicates Group G4 or G5.

In this case, a dialog 2101 for warning shown in FIG. 22 is displayed, thereby urging the user to execute the avoidance input operating instruction.

In FIG. 22, reference numeral 2102 denotes an OK button. When this button is selected, the printing is stopped. Reference numeral 2103 denotes a help button which displays a help about the dialog 2101.

Figure 23:
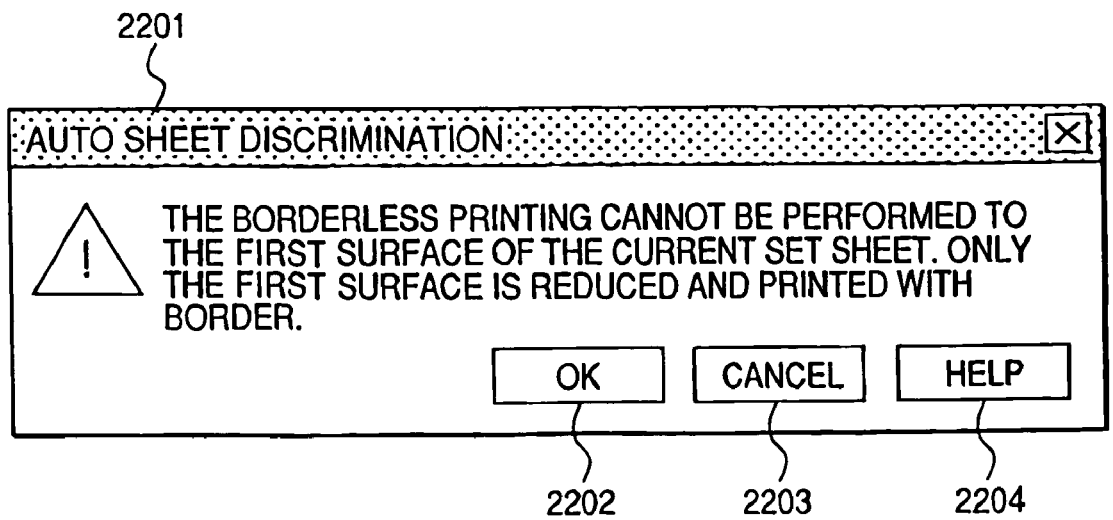
FIG. 23 is a diagram showing a fourth mismatch error dialog in the data processing apparatus according to the invention.

FIG. 23 is a diagram showing a second mismatch error dialog in the data processing apparatus according to the invention. This diagram is displayed on the display apparatus of the set information notifying unit 119 shown in FIG. 1.

The diagram shown as an example in FIG. 23 is displayed in the case where, at the time of the print data forming process, which will be explained hereinafter, the sheet type group in which only the first surface in the auto duplex printing cannot be "borderless" printed is detected as a sheet type of the recording medium 100 in spite of the setting of both of the auto duplex printing and the "borderless" printing.

Specifically speaking, the sheet type group in which only the first surface in the auto duplex printing cannot be "borderless" printed corresponds to Group G1 in FIG. 10. Although Group G1 includes the "plain paper" and the "postcard," as shown in FIG. 20, the first surface in the auto duplex printing of those recording media cannot be "borderless" printed. Therefore, the "borderless" printing cannot be executed to the first surface in the auto duplex printing if the discrimination result about the sheet type indicates Group G1.

In this case, a dialog 2201 shown in FIG. 23 is displayed, thereby urging the user to execute the inputting operation for avoiding such a situation.

In FIG. 23, reference numeral 2202 denotes an OK button. When this button is selected, the printing process to the first surface is continued in the bordered print setting, and the printing process to the second surface is executed in the "borderless" print setting. Reference numeral 2203 denotes a cancel button. When this button is selected, the printing is stopped. Reference numeral 2204 denotes a help button which displays a help about the dialog 2201.

The whole process and a control flow in the second embodiment are also similar to those in the first embodiment.

FIGS. 24A, 24B, 25A and 25B are flowcharts for explaining an example of a second data processing procedure in the data processing apparatus according to the invention and correspond to a detailed procedure for the print processing operation of the printer driver 110 shown in FIG. 1. Reference numerals (2301) to (2324) and (2401) to (2418) denote processing steps, respectively. In steps (2301) to (2305) and (2307) to (2324) in FIGS. 24A and 24B, the same processes as those in the corresponding steps in FIG. 15 in the first embodiment are executed.

Figure 24B:
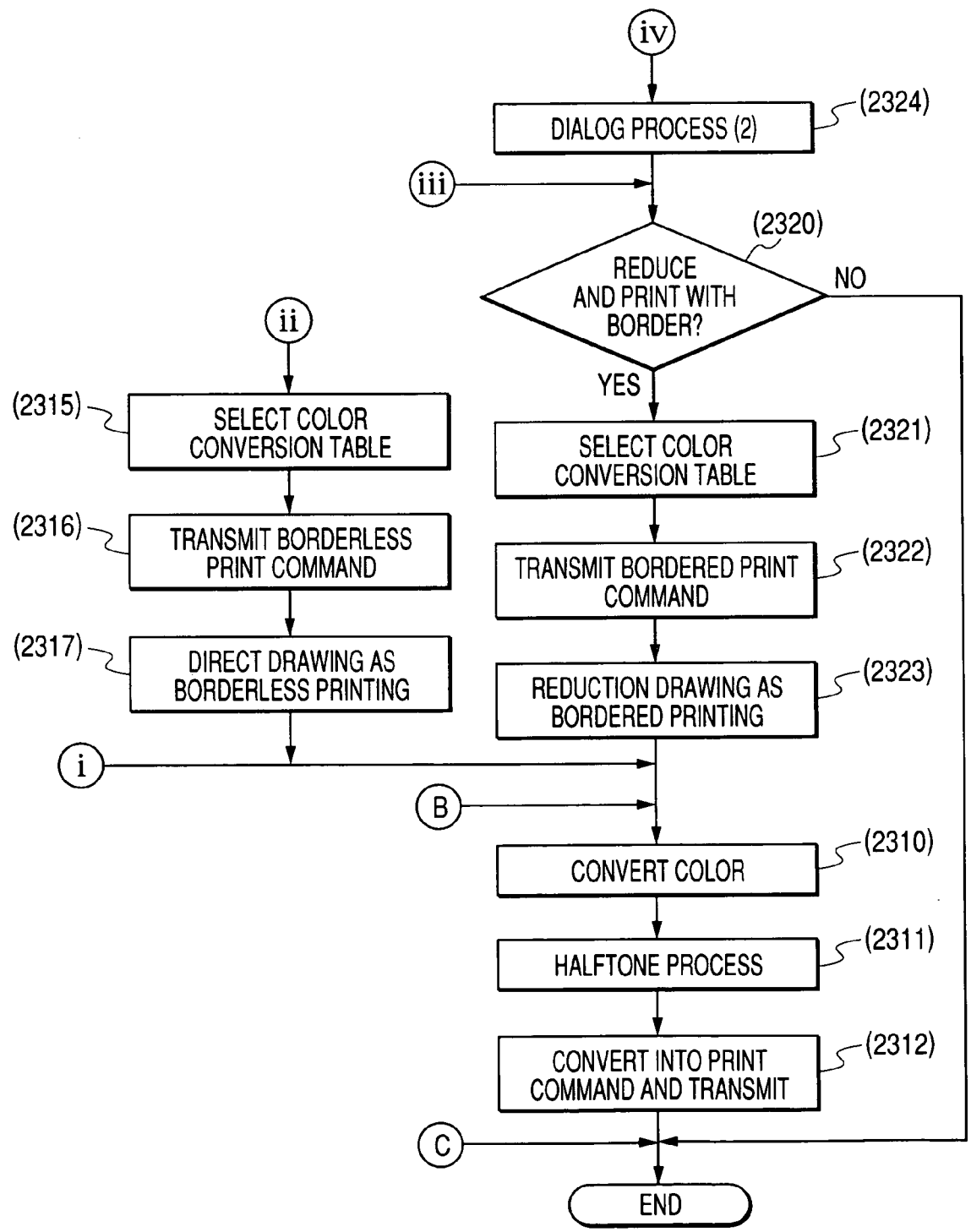
FIG. 24 is comprised of FIGS. 24A and 24B showing flowcharts for explaining an example of a second data processing procedure in the data processing apparatus according to the invention.

By discriminating whether or not the auto duplex printing has been designated in the current print setting of the printer driver 110 in step (2306) shown in FIGS. 24A and 24B, the processing routine branches.

If the auto duplex printing is not designated in step 2306, the processing routine advances to step 2313 through step 2306 and the simplex printing process similar to that in the first embodiment is executed after that.

Figure 25B:
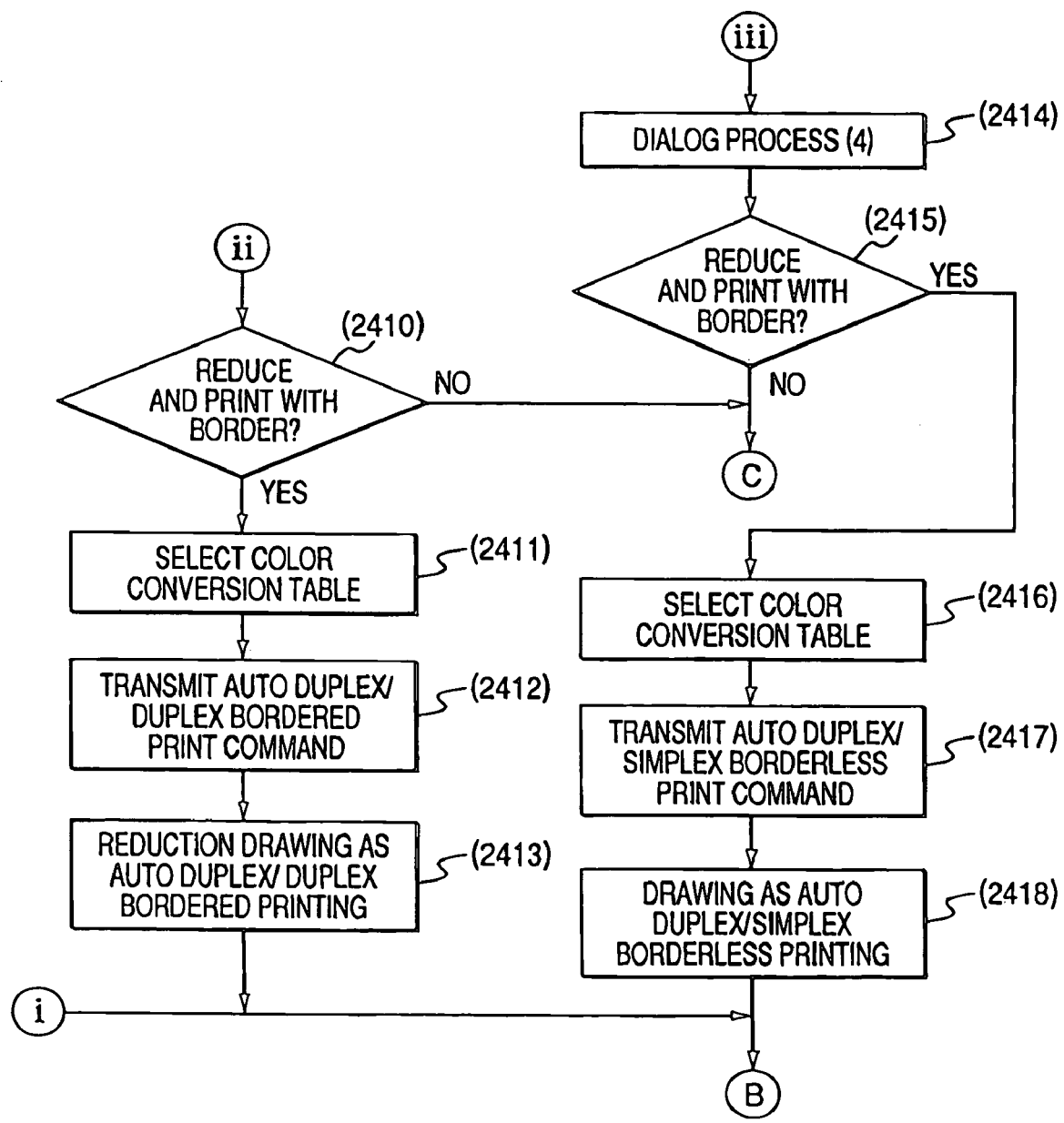
FIG. 25 is comprised of FIGS. 25A and 25B showing flowcharts for explaining an example of the second data processing procedure in the data processing apparatus according to the invention.

If the auto duplex printing has been designated in step (2306), the processing routine advances to the auto duplex printing process from step 2401 shown in FIGS. 25A and 25B.

In the auto duplex printing process (refer to FIGS. 25A and 25B), first, whether or not the media group discriminated in step (2304) corresponds to the auto duplex printing is discriminated (2401).

Specifically speaking, when the recording medium is the glossy film or OHP film shown in FIG. 20 which does not correspond to the auto duplex printing, that is, Group G4 or G5 in FIG. 10, it is determined that the auto duplex printing is impossible. An error message shown in FIG. 22 is displayed (2402) and the printing process is stopped.

If it is determined in step (2401) that the auto duplex printing is possible, whether or not the discriminated media group is a group in which only one side in the duplex printing can be "borderless" printed is discriminated (2403). If it is determined that only one side can be "borderless" printed, the processing routine branches to step (2414). If NO, whether or not the discriminated media group is a group in which the "borderless" printing may be impossible is discriminated (2404).

If it is determined that the media group is the group in which the "borderless" printing may be impossible, the processing routine branches to step (2408).

If it is determined in step (2404) that the media group is the group in which the "borderless" printing can be executed, the color conversion table for the "borderless" printing of the media group according to the discrimination result of step (2304) shown in FIGS. 24A and 24B is selected in accordance with the table shown in FIG. 11 (2405). The print start command for the auto duplex/duplex "borderless" ("borderless" to the both sides) print setting is formed and transmitted to the printer 101 (2406). The image is drawn into the buffer assured in the memory in the "borderless" print setting on the basis of the draw information accumulated in step (2301) shown in FIGS. 24A and 24B (2407). After that, the processing routine advances to step (2310) shown in FIGS. 24A and 24B. The color conversion, halftone process, conversion into a print command, and transmission of the point command are executed and a series of printing processes is finished.

When the processing routine branches to step (2408) from step (2404), the dialog box shown in FIG. 13 is displayed onto the monitor (displaying apparatus) provided for the set information notifying unit 119 shown in FIG. 1 and the apparatus receives the inputting operation from the user (2408).

Whether or not the user has selected the mode "Borderless printing to the current sheet" is discriminated (2409). If it is determined that the user has selected the mode "Borderless printing to the current sheet," step (2405) follows and the processes upon auto duplex/duplex "borderless" ("borderless" to the both sides) printing are executed.

If it is determined in step (2409) that the user does not select the mode "Borderless printing to the current sheet," whether or not he has selected the mode "Reduce the image and print with border" is further discriminated (2410). If it is determined that the user has selected the mode "Reduce the image and print with border," the color conversion table for the bordered printing of the media group according to the discrimination result of step (2304) shown in FIGS. 24A and 24B is selected in accordance with the table shown in FIG. 11 (2411). The print start command of the auto duplex/duplex bordered (bordered to the both sides) print setting is formed and transmitted to the printer 101 (2412).

The drawing process into the buffer assured in the memory is executed on the basis of the draw information accumulated in step (2301) shown in FIGS. 24A and 24B. In this instance, by converting the drawing position and size, the image information is reduced and the reduced image is drawn in the printable area in the bordered print setting (2413). After that, the color conversion, halftone process, conversion into a print command, and transmission of the print command are executed after step (2310) shown in FIGS. 24A and 24B. If the user selects "cancel," the printing process is finished at that point of time. Thus, the printing is cancelled.

When the processing routine branches to step (2414) from step (2403), the dialog box shown in FIG. 23 is displayed onto the monitor provided for the set information notifying unit 119 shown in FIG. 1 and the apparatus receives the inputting operation from the user (2414).

When the user selects "OK" in the displayed dialog by operating the print setting input operation unit 118 shown in FIG. 1 (2415), the color conversion table is selected in accordance with the table shown in FIG. 11 (2416). A print start command for the auto duplex/simplex "borderless" (bordered to the one side and "borderless" to the other) print setting is formed and transmitted to the printer 101 (2417).

The drawing process into the buffer assured in the memory is executed on the basis of the draw information accumulated in step (2301) shown in FIGS. 24A and 24B. In this instance, with respect to the first surface of each recording medium, by converting the drawing position and size, the image based on the image information is drawn in the printable area in the bordered print setting and, with respect to the second surface, the processes of the "borderless" printing are executed (2418). The processing routine advances to step (2310) shown in FIGS. 24A and 24B.

Thus, with respect to the "plain paper" and the "postcard" among the sheets shown in FIG. 20, the reduced bordered printing is executed only to the first surface and the direct (equal magnification) "borderless" printing is executed to the second surface of each recording media.

If it is determined in step (2415) that the user has selected the "cancel" button 1205 on the dialog shown in FIG. 23, the printing is finished at that point of time.

As described above, also in the second embodiment, the type of recording medium 100 is discriminated and the setting is properly performed by the functions of the media sensor 104 and the sheet specifying processing unit 114 in a manner similar to the first embodiment. Therefore, the printing processes including the "borderless" printing processes in the duplex printing process can be automatically executed even for the user who does not have enough knowledge of the setting of the sheet type on the basis of the proper settings without executing the complicated operation such as setting of the sheet type.

Since the processing routine branches to steps (2313) and (2314) in FIGS. 24A and 24B and steps (2401), (2403), and (2404) in FIGS. 25A and 25B, it is prevented that the auto duplex printing and the "borderless" printing are executed to the type of sheet which is improper for those printings. The damage to the printer or the wasteful consumption of the sheets which are caused by executing the improper printing to such sheets can be avoided.

Further, by providing the reducing process in steps (2321) to (2323), (2411) to (2413), and (2416) to (2418) as a substituting process of the "borderless" printing, the user can obtain the image output without executing the complicated operation for reprinting. Since a natural image such as a photograph or the like is mainly presumed as a target image of the whole surface "borderless" printing, even if the image is slightly reduced for the bordered printing, a serious problem does not occur in terms of a change in image size, picture quality, or the like. An advantage of reduction of troublesomeness of the user operation can be obtained.

By the reducing process of only one side in steps (2416) to (2418), even if the user himself does not have knowledge of such a complicated restriction due to a combination of conditions that only in the case of executing the "borderless" auto duplex printing to the plain paper or postcard the first surface cannot be "borderless" printed, the processes which satisfy as much as possible such an intention of the user that he wants to execute the "borderless" duplex printing within a range of the specification of the printer can be realized only by a simple procedure such as an operation to the dialog 2201.

Third Embodiment

The third embodiment to realize the invention will now be described with reference to the drawings.

It is a feature of the third embodiment that the discrimination processing function of the media group and the final print data creation processing function including the color conversion processing function, the image reduction processing function, and the like are provided for the printer side.

On the other hand, only the forming process of data which does not depend on the sheet type, specifically speaking, a command for positioning a print object and a command for controlling the printer is executed through the printer driver on the PC side.

Figure 26:
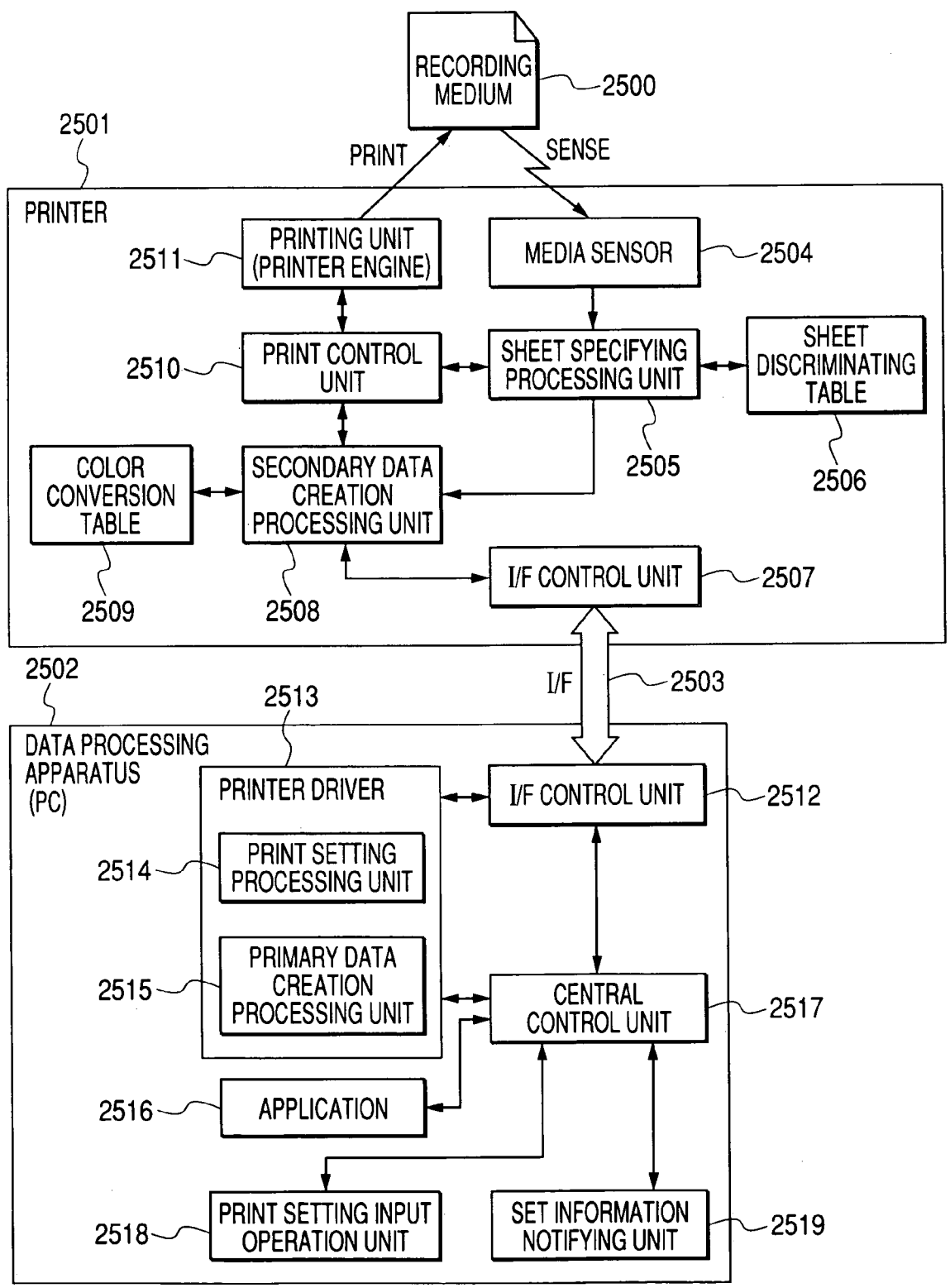
FIG. 26 is a block diagram for explaining a construction of a printing system showing the third embodiment of the invention.

FIG. 26 is a block diagram for explaining a construction of a printing system showing the third embodiment of the invention.

In FIG. 26, reference numeral 2501 denotes a color printer of the ink jet system for forming an image. The printer 2501 forms the image on the basis of print data formed by a PC 2502, which will be explained hereinafter. Although a type of printer is not particularly limited so long as the "borderless" printing is possible, the color printer of the ink jet system is presumed here.

The printer 2501 is constructed by various functional blocks 2504, 2505, 2507, 2508, 2510, and 2511.

Reference numeral 2502 denotes the data processing apparatus (PC) for forming the print data and controlling the connected printer 2501. A personal computer (hereinbelow, abbreviated to "PC") is presumed here. The PC 2502 also plays a role of receiving an instruction or an input from the user regarding the print setting.

The PC 2502 is constructed by various functional blocks 2512, 2513, and 2516 to 2519. Although not shown in the diagram, "Windows" (registered trademark) made by Microsoft Corporation has been installed as an operating system (hereinbelow, also abbreviated to "OS") for controlling the PC 2502. The above various functional blocks are made operative by using the functions of the OS.

Reference numeral 2503 denotes a communication interface (I/F) for connecting the PC 2502 to the printer 2501. Although the USB as a serial interface is presumed here, any other wire/radio interfaces can be used so long as they can realize the bidirectional communication. For example, it is possible to use IEEE1394, Ethernet (registered trademark), IrDA (registered trademark), IEEE802.11, a power line, or the like, or a parallel interface such as Centronics, SCSI, or the like.

As mentioned above, the printing system in the embodiment is not a single apparatus but has a construction in which the PC 2502 and the printer 2501 to form the image are connected by the specific bidirectional interface. However, the invention is not limited to such an example but can be also applied to a hybrid type printing system in which the functions of the PC and the printer as mentioned above are integratedly implemented.

Among functions of the printer 2501 and PC 2502, explanation of the functions which are not particularly necessary upon explanation of features of the embodiment is omitted here.

Reference numeral 2504 denotes a sheet recognizing sensor (media sensor) for obtaining information to specify a type of recording medium 2500. The media sensor 2504 is attached onto a carriage on which a recording head has been mounted or on a conveying path of the recording medium. It is assumed that the media sensor 2504 detects the recording medium 2500 while it is fed to a print mechanism unit from a sheet feeder, a paper feed tray, a sheet cassette, or the like equipped for the printer 2501 or at a point of time when it has been fed to the print mechanism unit.

Although a principle and a construction of the media sensor are not limited in particular here, it is assumed that the media sensor has the function which can discriminate at least the presumed types of sheets.

The media sensor which is presumed in the embodiment is a device of a relatively low price which can be attached to the product and in which sheet recognizing precision is not so high. It is assumed that the media sensor makes discrimination among the groups shown in FIG. 10.

Reference numeral 2505 denotes a sheet specifying processing unit for specifying the sheet on the basis of an output result of the media sensor 2504. In the embodiment, the sheet type is specified by using a table 2506 for reference.

Reference numeral 2507 denotes an I/F control unit for performing an interface function of the printer 2501. Since the presumed interface is the USB here, it is assumed that the I/F control unit 2507 is constructed by a controller on a peripheral equipment side of the USB. In the I/F control unit 2507, reception of primary print data and control commands formed by the PC 2502 and the like are executed.

Reference numeral 2508 denotes a secondary data creation processing unit which forms final print data (secondary data) by executing a color converting process and a halftone process in accordance with sheet information discriminated in the sheet specifying processing unit 2505 on the basis of the print data (primary data) transmitted from the PC 2502.

Specifically speaking, the secondary data includes various commands for controlling: halftone-processed data for printing; an injection amount of the ink; the number of paths; a printing direction, and a conveyance amount of the sheet. When the color converting process is executed by the secondary data creation processing unit 2508, a color conversion table 2509 is referred to. In the embodiment, this functional block becomes a fundamental portion of the invention.

Reference numeral 2510 denotes a print control unit which receives the secondary print data formed by the secondary data creation processing unit 2508 and develops it into a printer engine 2511. The print control unit 2510 controls the printer engine in accordance with a print control command included in the print data.

Reference numeral 2511 denotes the printing unit (printer engine) for printing onto the recording medium 2500 on the basis of the print data developed by the print control unit 2510. Since the printer 2501 is a printer of the ink jet system, it forms an image by ejecting the ink.

Reference numeral 2512 denotes an I/F control unit for performing an interface function of the PC 2502. The I/F control unit 2512 is constructed by a controller of the host side of the USB and has functions as a USB host. A part of the functions as a USB host can be constructed by software such as OS, driver, or the like.

Reference numeral 2513 denotes a printer driver as software for performing various settings for printing, forming the print data, and controlling the printer on the PC 2502. The printer driver 2513 is constructed by various functional blocks 2514 and 2515.

The printer driver 2513 does not form the final print data but simply executes only a forming process of data which does not depend on the sheet type, specifically speaking, a command for positioning a print object and a command for the printer control. The secondary data based on such data is formed by the printer 2501.

Reference numeral 2514 denotes a print setting processing unit for performing various print settings including the setting of the sheet, the setting of the print quality, and the like. The print setting processing unit 2514 has functions for receiving an instruction or an input by the user from a print setting input operation unit 2518 and displaying or notifying the set contents onto a display apparatus provided for a set information notifying unit 2519.

Reference numeral 2515 denotes a processing unit for forming the primary data for printing. The primary data creation processing unit 2515 forms the primary print data in a unique format which can be interpreted by the printer 2501 in accordance with the printer 2501 and the print setting performed by the print setting processing unit 2514 and also forms the printer control command.

Reference numeral 2516 denotes application software which forms data to be printed by the user. As application software 2516, since a field, an application, and installation details are not limited to those of a word processor, spreadsheet software, an E-mail reader, a WWW browser, image processing software, and the like so long as they can execute the printing by the printer 2501 through the printer driver 2513 by using the standard functions of the OS, their detailed description is omitted here.

Reference numeral 2517 denotes a central control unit for controlling various functions of the PC 2502. Specifically speaking, the functions of the CPU correspond to them.

Reference numeral 2518 denotes the print setting input operation unit constructed by various input devices (keyboard, pointing device, etc.) for reflecting the intention of the user to the print setting. Reference numeral 2519 denotes the set information notifying unit for notifying the user of the print setting and the change information. As a notifying method, a case of using a display apparatus such as a monitor (display apparatus) or the like, a notification by a voice sound, or the like is considered.

Figure 27:
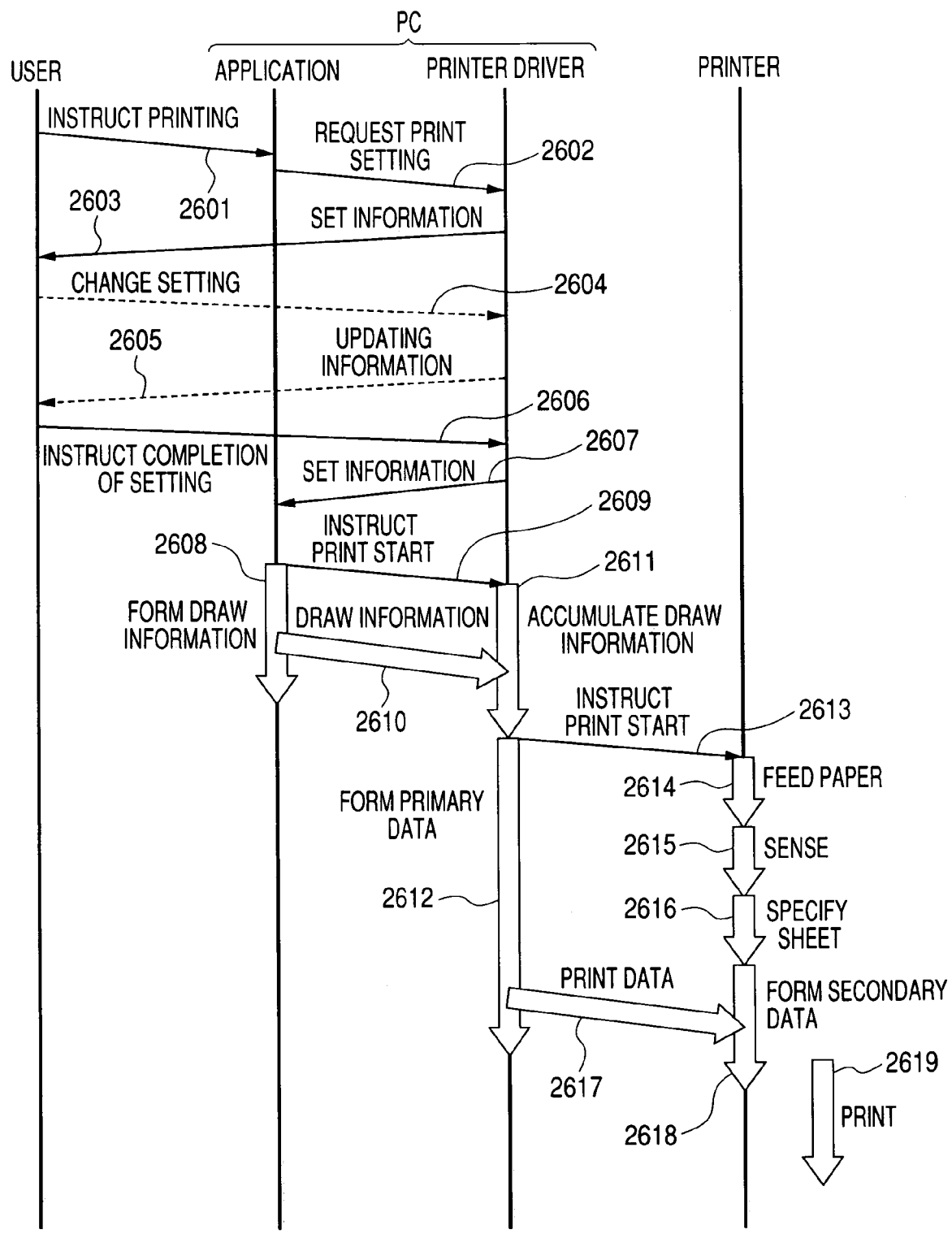
FIG. 27 is a chart for explaining a flow of a series of data processes which are associated among an application, a printer driver, and the printer in the printing system according to the invention.

FIG. 27 is a chart for explaining a flow of a series of data processes which are associated among the application, printer driver, and printer in the printing system according to the invention. This chart corresponds to the data processes in the printer driver 2513, the application 2516, and the printer 2501 shown in FIG. 26 and the user action. Reference numerals (2601) to (2619) denote processing steps (procedure), respectively.

Since steps (2601) to (2611) correspond to steps (1403) to (1413) shown in FIG. 14 in the first embodiment, their detailed description is omitted here.

In step 2612, the primary data creation processing unit 2515 forms the primary print data which can be interpreted by the printer 2501. At this time, first, a print start instruction is transmitted to the printer 2501 in step (2613).

In step (2614), in response to the print start instruction of step (2613), the paper feeding operation is executed to convey the sheet set on the sheet feeder, paper feed tray, cassette, or the like of the printer to the sensing position. Thus, the sheet is conveyed to the position where the sheet can be sensed by the media sensor.

Subsequently, in step (2615), the type of the conveyed sheet is sensed. In step (2616), to which one of the groups in FIG. 10 the sheet that is being conveyed at present belongs is specified from an output result of the media sensor. In step (2617), the primary data formed in step (2612) is transmitted to the printer 2501 from the PC 2502.

In step (2618), the secondary data according to the sheet type is formed on the basis of the information for specifying the sheet type in step (2616) and the primary data sent to the printer 2501 in step (2617).

Specifically speaking, although the color conversion and the halftone process according to the sheet type are executed, in this instance, the processes corresponding to the print setting and data creation in steps (1417) and (1420) shown in FIG. 15 in the first embodiment are also executed.

That is, in the case of the media which cannot be "borderless" printed, the image reducing process is executed. However, unlike the case of the first embodiment, since the error dialog cannot be displayed to the user on the printer 2501, media Group G2 in which the "borderless" printing may be impossible is regarded as a group which cannot be "borderless" printed and the reducing process is forcedly executed. In the case of media Groups G4 and G5 in which the "borderless" printing cannot be executed, the printing is not cancelled but forcedly continued by the reducing process. It is assumed that the set values of a margin width in the bordered printing and a lapping amount in the "borderless" printing are included in the primary print data received from the PC 2502.

In step (2619), the printing to the recording medium 2500 is executed on the basis of the formed secondary data.

As described above, also in the third embodiment, the type of recording medium 2500 is discriminated and the setting is properly performed by the functions of the media sensor 2504 and the sheet specifying processing unit 2505. Therefore, printed matter according to the proper setting can be provided even for the user who does not have enough knowledge of the setting of the sheet type without executing the complicated operation such as setting of the sheet type.

It is prevented that the "borderless" printing is executed to the type of sheet which is improper for the "borderless" printing in step (2618) shown in FIG. 27. The damage to the printer or the wasteful consumption of the sheets can be avoided.

Since the apparatus does not inquire of the user when the substituting process is applied, there is a possibility that the output which the user does not intend is executed. However, since a natural image such as a photograph or the like is mainly presumed as a target image of the whole surface "borderless" printing, a small change in image size or picture quality due to the image reduction does not cause a serious problem. An advantage of reduction of troublesomeness of the user operation can be obtained.

OTHER EMBODIMENTS

Other embodiments to realize the invention will be described hereinbelow.

The case where the image is reduced and the bordered printing process is executed as a substitute printing process at the time when the media type is determined to be the media which cannot be "borderless" printed has been described in the first to third embodiments as a feature of the invention. However, as a process for outputting a predetermined image while avoiding the occurrence of the inconvenience due to the execution of the "borderless" printing, it is also possible to use a method whereby four peripheries or two sides such as right side and lower side or the like of the original image (image data 802 shown in FIG. 9) formed for the "borderless" printing are cut out and an image of the size of the printable range (image data 702 shown in FIG. 8) in the bordered printing is formed.

In this case, the resolution of the image is not changed but the portion of the width "x1+x2+x3+x4" is deleted in order to set the image of the width "we" formed for the "borderless" printing to the width wn. Also with respect to the longitudinal direction of the image, the portion of the height "y1+y2+y3+y4" is similarly deleted in order to set the height "he" to the height "hn."

Figure 28:
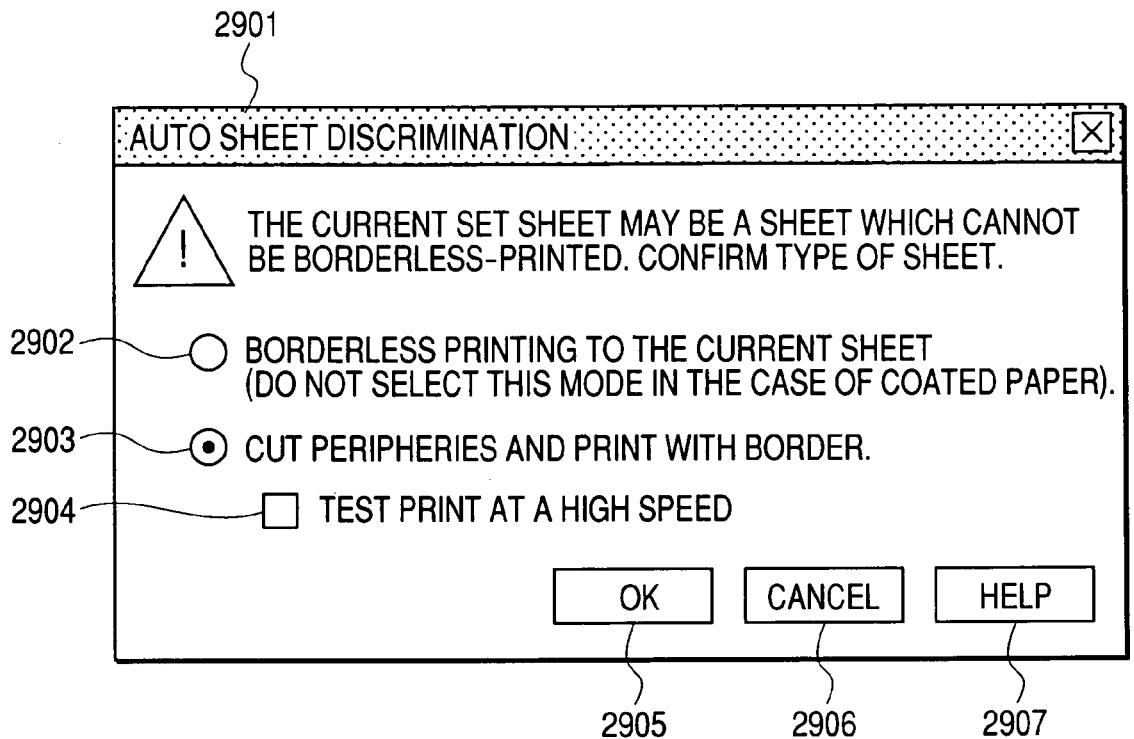
FIG. 28 is a diagram showing an example of an auto sheet discriminating dialog in the data processing apparatus according to the invention.
Figure 29:
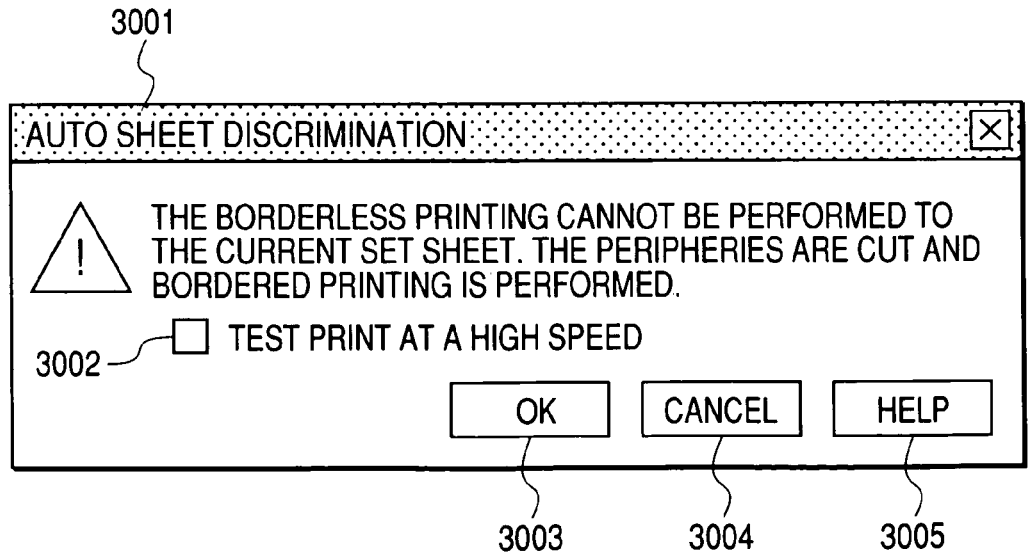
FIG. 29 is a diagram showing an example of the auto sheet discriminating dialog in the data processing apparatus according to the invention.

In this embodiment, dialogs of FIGS. 28 and 29 are displayed in place of, for example, the dialogs of FIGS. 13 and 14 in the first embodiment, respectively.

FIGS. 28 and 29 are diagrams showing examples of an auto sheet discriminating dialog in the data processing apparatus according to the invention.

In the dialog shown in FIG. 28, if the user selects a radio button 2902 and an OK button 2905, the processes are continued in the "borderless" print setting in a manner similar to the first embodiment.

When a radio button 2903 is selected, in place of reducing and drawing the image in step 1522 shown in FIGS. 16A and 16B, the peripheries of the image are deleted and drawn by the above method and the bordered printing is executed.

In the dialog shown in FIG. 29, when an OK button 3003 is selected, the bordered printing is also similarly executed.

If it is determined that a check box 2904 or 3002 has been checked by the user instruction, the print quality is lowered and the printing is executed at a high speed.

In the case of executing the bordered printing in this embodiment, although the image corresponding to the above width of the four peripheries of the paper surface is lost, a serious problem does not occur because with respect to the photograph serving as a main target of the "borderless" printing, a main object hardly exists at the edge of the image and the image corresponding to the lapping amount is also lost in the "borderless" printing. In this method, since the image is not reduced, there are such advantages that the output of the same scale as that upon "borderless" printing is obtained and the picture quality does not deteriorate at all by the reducing process.

On the other hand, since a part of the peripheries of the image is lost, the output in this case can be also used as a test print.

When the check box 2904 or 3002 is checked, instead of deteriorating the picture quality, the image is outputted at a high speed by a method whereby the drawing process in step 1522 is simplified, a command of a high speed mode is transmitted to the printer in step 1511, or the like.

According to such a method, although a part of the peripheries of the image is cut out, there is such an advantage that the test print showing an outline of the image can be promptly obtained by the simple operation. Naturally, the bordered printing by the reduction described in the first embodiment can be also combined with the high speed printing.

On the contrary to the method of reducing the image or cutting out a part thereof when the media type is determined to be the media which cannot be "borderless" printed, it is also possible to use a method whereby image information is always formed for the printable range in the bordered printing and only when it is determined that the media type is the media which can be "borderless" printed, the image is enlarged and drawn to the range where the lapping amount in the "borderless" printing is taken into consideration of.

In this case, since the enlarging process of the image has to be always executed unless otherwise the printing is executed in inappropriate conditions, a load of the processes increases and the picture quality is slightly changed due to the enlargement of the image. However, results similar to those in the foregoing embodiments are obtained with respect to the operation of the user and the output result.

In the third embodiment, the dialog is not displayed for the user but the processes are forcedly continued by the reduction printing. However, it is also possible to use a construction in which by providing a display panel and operation buttons onto the printer, the dialog process is executed on the printer and the operation to which the intention of the user is reflected is executed.

It is also possible to use a construction in which by notifying the PC 2502 of the mismatching state by the bidirectional communication between the printer 2501 and the PC 2502, the dialog process is executed on the PC 2502, and a processing result is transmitted to the printer 2501, thereby executing the operation to which the intention of the user is reflected.

In this case, in a manner similar to the first and second embodiments, it is possible to prevent the substituting process from being executed against the intention of the user.

The invention is also accomplished by a method whereby a storing medium in which program codes as software for realizing the functions of one of the foregoing embodiments have been recorded is supplied to a system or an apparatus and a computer (or a CPU or an MPU) of the system or apparatus reads out the program codes stored in the storing medium and executes the processes corresponding to the program codes.

Further, although the case of executing the bordered printing process when it is determined that the "borderless" printing is impossible has been described, it is also possible to control in such a manner that by executing a specific image process, for example, by executing the image process so that the image is thinly printed in the case of printing at a high speed or printing in an energy saving mode to the "borderless" print data, that is, the print data having widths of specific four sides locating on the border sides, it is possible to cope with a request from the user through the user interface so that the image can be printed onto the whole surface of the sheet although the color tone changes on the border side.

Figure 30:
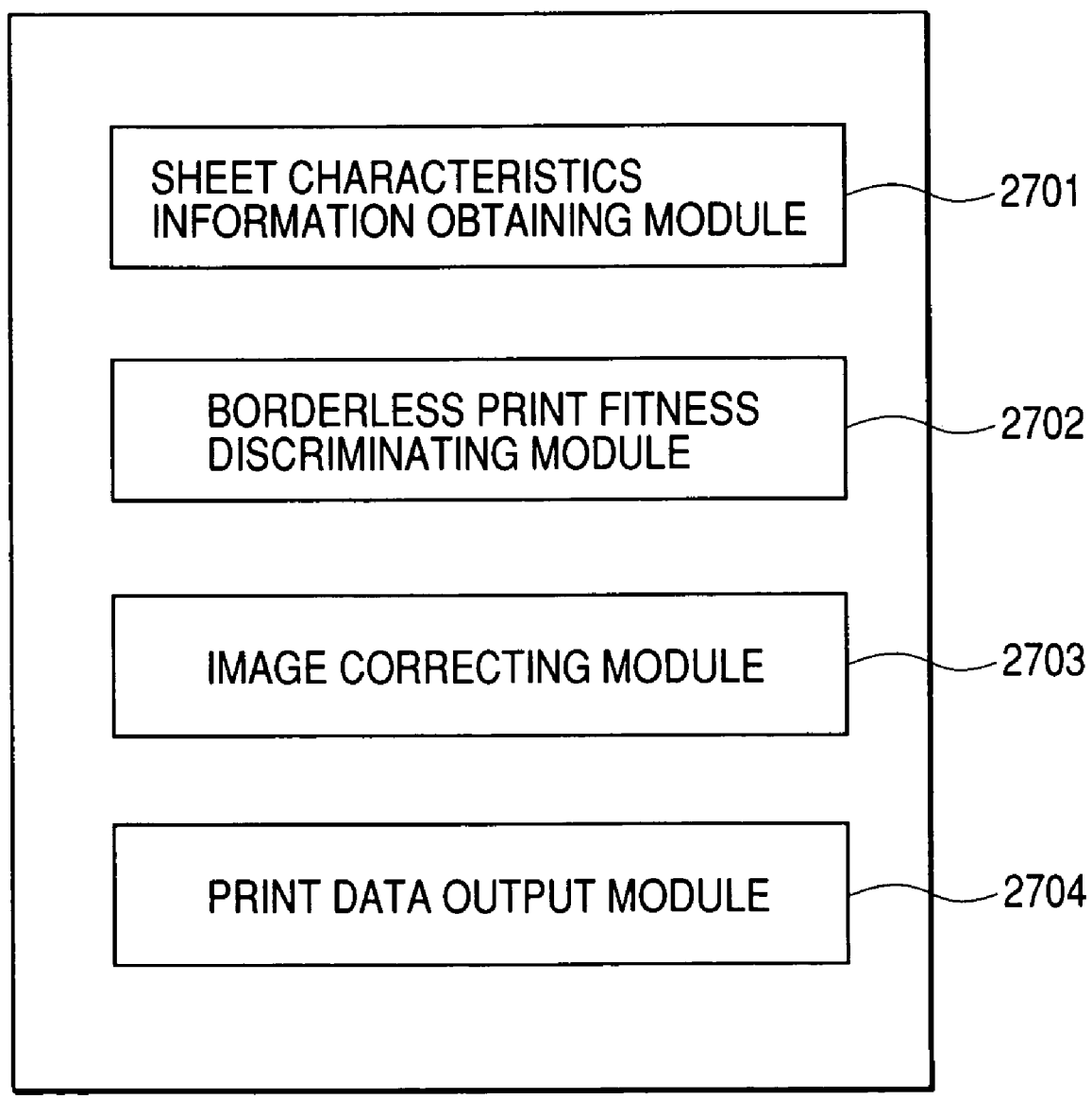
FIG. 30 is a diagram in which functions of the printer driver shown in FIG. 1 are shown as modules.

FIG. 30 is a diagram showing the functions of the printer driver 110 shown in FIG. 1 as modules and corresponds to a memory map in the case where they are stored into a predetermined recording medium (which will be explained in detail hereinbelow).

In FIG. 30, reference numeral 2701 denotes a sheet characteristics information obtaining module corresponding to the functional processing procedure which is executed by the sheet specifying processing unit 114 shown in FIG. 1. Reference numeral 2702 denotes a borderless print fitness discriminating module corresponding to the functional processing procedure which is executed by the data creation processing unit 112 shown in FIG. 1.

Reference numeral 2703 denotes an image correcting module corresponding to the functional processing procedure which is executed by the data creation processing unit 112 shown in FIG. 1. Reference numeral 2704 denotes a print data output module corresponding to the functional processing procedure which is executed by the data creation processing unit 112 shown in FIG. 1.

A construction of data processing programs which can be read out by the data processing apparatus according to the invention will now be described hereinbelow with reference to a memory map shown in FIG. 31.

FIG. 31 is a diagram for explaining the memory map on a storing medium for storing the various data processing programs which can be read out by the data processing apparatus according to the invention.

In this case, the program codes themselves read out from the storing medium realize the functions of the embodiments mentioned above and the storing medium in which the program codes have been stored constructs the invention. As a storing-medium for supplying the program codes, for example, an FD (floppy (registered trademark) disk), an optical disk such as hard disk, CD-ROM, a CD-R, CD-RW, DVD-RAM, DVD+RW, or the like, a magnetooptic disk such as an MO or the like, a magnetic tape, a non-volatile memory card such as a flash memory or the like, a ROM, or the like corresponds to the storing medium and an arbitrary one of them can be used. Naturally, the invention incorporates not only the case where a computer executes the read-out program codes, so that the functions of the embodiments as mentioned above are realized but also the case where an OS (Operating System) or the like which is operating on the computer executes a part or all of actual processes on the basis of instructions of the program codes and the functions of the embodiments as mentioned above are also realized by those processes.

Naturally, the invention further incorporates the case where the program codes read out from the storing medium are written into a memory provided for a function expanding board inserted in a computer or a function expanding unit connected to the computer and, thereafter, a CPU or the like provided for the function expanding board or the function expanding unit executes a part or all of actual processes on the basis of instructions of the program codes and the functions of the embodiments as mentioned above are realized by those processes.

In the case of applying the invention to the storing medium, for example, the program codes corresponding to the printer driver 110, the various tables shown in FIGS. 10 and 11, and the flowchart shown in FIGS. 16A and 16B described above are stored into the storing medium. When explaining simply, each of the modules shown in the example of the memory map in FIG. 30 is stored into the storing medium. That is, it is proper to store at least the program codes of the sheet characteristics information obtaining module 2701, the borderless print fitness discriminating module 2702, the image correcting module 2703, and the print data-output-module 2704 into the storing medium.

As described above, even if the construction for realizing the functions is the storing medium in which the computer-readable program codes have been stored or the software as program codes themselves, a printing system in which the operability of the user is excellent while avoiding the execution of the "borderless" printing to the improper sheet can be provided.

Therefore, the format of the program such as object code, program which is executed by an interpreter, script data which is supplied to the OS, or the like is not limited so long as it has the functions of the program.

As another program supplying method, the program can be also supplied by a method whereby the computer is connected to homepage of the Internet by using a browser of the client computer and the computer program itself of the invention is downloaded from the homepage or a compressed file including an auto installing function is downloaded onto a recording medium such as a hard disk or the like. The program supplying method can be also realized by a method whereby the program codes constructing the program of the invention are divided into a plurality of files and each file is downloaded from different homepage.

In other words, a WWW server, an ftp server, and the like for downloading a program file to realize the functional processes of the invention by a computer into a plurality of users are also incorporated in the scope of claims of the invention.

The program supplying method can be also realized by a method whereby the program of the invention is encrypted, stored into a storing medium such as a CD-ROM or the like, and distributed to the uses, and the user who can satisfy predetermined conditions is allowed to download key information for decrypting the encryption from the homepage through the Internet, the encrypted program is executed by using the key information, and the program is installed into the computer.

Naturally, the invention incorporates not only the case where the computer executes the read-out program codes, so that the functions of the embodiments mentioned above are realized but also the case where an OS (Operating System) or the like which is operating on the computer executes a part or all of actual processes on the basis of instructions of the program codes and the functions of the embodiments as mentioned above are realized by those processes.

Further, naturally, the invention incorporates the case where the program codes read out from the storing medium are written into a memory provided for a function expanding board inserted in a computer or a function expanding unit connected to the computer and, thereafter, a CPU or the like provided for the function expanding board or the function expanding unit executes a part or all of actual processes on the basis of instructions of the program codes and the functions of the embodiments as mentioned above are realized by those processes.

The invention is not limited to the above embodiments but many variations and modifications (including organic combinations of each embodiment) are possible on the basis of the spirit of the invention and are not excluded from the scope of the invention.

Although the invention has been described with respect to the various embodiments, it will obviously be understood with ordinary skill in the art that the spirit and scope of the invention are not limited to those of the specific explanation in the specification but the following Examples are also incorporated. Such Examples 1 to 30 will now be described hereinbelow.

EXAMPLE 1

There is provided a data processing apparatus which has a detecting unit of characteristics information of a sheet that is conveyed to a printing unit and can communicate with a printing apparatus which can convey the sheet and set a print mode for printing-onto the whole or a part of the surface of the sheet, comprising: characteristics information obtaining means (for example, corresponding to the sheet specifying processing unit 114 of the printer driver 110 shown in FIG. 1) for obtaining the characteristics information of the sheet from the printing apparatus; storing means (for example, corresponding to the sheet discriminating table 115 shown in FIG. 1) for storing discrimination data for group-discriminating the characteristics information of the sheet which can be detected by the detecting unit; fitness discriminating means (for example, corresponding to the sheet specifying processing unit 114 of the printer driver 110 shown in FIG. 1) for discriminating whether or not the printing to the whole surface of the sheet is proper on the basis of the characteristics information obtained by the characteristics information obtaining means and the discrimination data; image correcting means (for example, corresponding to the data creation processing unit 112 of the printer driver 110 shown in FIG. 1) for, when a whole surface print mode has been designated for image information which is formed, correcting the image information by executing a predetermined image process thereto on the basis of a discrimination result by the fitness discriminating means; and output means (for example, corresponding to the printer driver 110 shown in FIG. 1) for outputting the image information corrected by the image correcting means to the printing apparatus.

EXAMPLE 2

The data processing apparatus according to Example 1, wherein if it is determined by the fitness discriminating means that the sheet is improper for the whole surface printing, the image correcting means corrects the image information by reducing the image information.

EXAMPLE 3

The data processing apparatus according to Example 1, wherein if it is determined by the fitness discriminating means that the sheet is improper for the whole surface printing, the image correcting means corrects the image information by deleting a part of the image information.

EXAMPLE 4

The data processing apparatus according to Example 1, wherein if it is determined by the fitness discriminating means that the sheet is suitable for the whole surface printing, the image correcting means corrects the image information by enlarging the image information.

EXAMPLE 5

The data processing apparatus according to Example 1, wherein the discrimination data includes a case where it is determined that the sheet which is improper for the whole surface printing and the sheet which is suitable for the whole surface printing belong to the same group.

EXAMPLE 6

The data processing apparatus according to Example 1, wherein the print mode includes a duplex print mode and a simplex print mode.

EXAMPLE 7

The data processing apparatus according to Example 6, wherein the fitness discriminating means discriminates whether or not the sheet is proper to the whole surface printing in the simplex print mode or whether or not the sheet is proper to the whole surface printing for the first surface or the second surface in the duplex print mode on the basis of a setting state of the print mode and the discrimination data.

EXAMPLE 8

There is provided a printing apparatus which has a detecting unit of characteristics information of a sheet which is conveyed to a printing unit, conveys the sheet, and outputs image information that is transferred from a data processing apparatus to the whole or a part of the surface of the sheet, comprising: characteristics information obtaining means (corresponding to the sheet specifying processing unit 2505 shown in FIG. 26) for obtaining the characteristics information of the sheet which can be detected by the detecting unit; fitness discriminating means (corresponding to the sheet specifying processing unit 2505 shown in FIG. 26) for discriminating whether or not the printing to the whole surface of the sheet is proper on the basis of the characteristics information obtained by the characteristics information obtaining means; image correcting means (corresponding to the secondary data creation processing unit 2508 shown in FIG. 26) for, when a whole surface print mode has been designated to the image information, correcting the image information by executing a predetermined image process to the image information transferred from the data processing apparatus on the basis of a discrimination result by the fitness discriminating means; and control means (corresponding to the print control unit 2510 shown in FIG. 26) for controlling so as to output the image information corrected by the image correcting means or the image information whose, whole surface printing is possible to the printing unit.

EXAMPLE 9

The printing apparatus according to Example 8, wherein if the sheet is improper for the whole surface printing, the image correcting means corrects the image information by reducing the image information.

EXAMPLE 10

The printing apparatus according to Example 8, wherein if the sheet is improper for the whole surface printing, the image correcting means corrects the image information by deleting a part of the image information.

EXAMPLE 11

The printing apparatus according to Example 8, wherein if the sheet is suitable for the whole surface printing, the image correcting means corrects the image information by enlarging the image information.

EXAMPLE 12

There is provided a print control method for a data processing apparatus which has a detecting unit of characteristics information of a sheet that is conveyed to a printing unit and can communicate with a printing apparatus which can convey the sheet and set a print mode for printing onto the whole or a part of the surface of the sheet, comprising: a characteristics information obtaining step (step (1503) shown in FIGS. 16A and 16B) of obtaining the characteristics information of the sheet from the printing apparatus; a fitness discriminating step (steps (1504), (1512), and (1513) shown in FIGS. 16A and 16B) of discriminating whether or not the printing to the whole surface of the sheet is proper on the basis of the characteristics information obtained by the characteristics information obtaining step and discrimination data for group-discriminating the characteristics information of the sheet which is stored an can be detected by the detecting step; an image correcting step (step (1522) shown in FIGS. 16A and 16B) of, when a whole surface print mode has been designated for image information which is formed, correcting the image information by executing a predetermined image process thereto on the basis of a discrimination result by the fitness discriminating step; and an output step (step (1511) shown in FIG. 16) of outputting the image information corrected by the image correcting step to the printing apparatus.

EXAMPLE 13

The print control method according to Example 12, wherein in the image correcting step, if it is determined by the fitness discriminating step that the sheet is improper for the whole surface printing, the image information is corrected by reducing the image information.

EXAMPLE 14

The print control method according to Example 12, wherein in the image correcting step, if it is determined by the fitness discriminating step that the sheet is improper for the whole surface printing, the image information is corrected by deleting a part of the image information.

EXAMPLE 15

The print control method according to Example 12, wherein in the image correcting step, if it is determined by the fitness discriminating step that the sheet is suitable for the whole surface printing, the image information is corrected by enlarging the image information.

EXAMPLE 16

The print control method according to Example 12, wherein the discrimination data includes a case where it is determined that the sheet which is improper for the whole surface printing and the sheet which is suitable for the whole surface printing belong to the same group.

EXAMPLE 17

The print control method according to Example 12, wherein the print mode includes a duplex print mode and a simplex print mode.

EXAMPLE 18

The print control method according to Example 17, wherein the fitness discriminating step (steps (2304), (2306), (2313), and (2314) shown in FIGS. 24A and 24B; steps (2401), (2403), and (2404) shown in FIGS. 25A and 25B) discriminates whether or not the sheet is proper to the whole surface printing in the simplex print mode or whether or not the sheet is proper to the whole surface printing for the first surface or the second surface in the duplex print mode on the basis of a setting state of the print mode and the discrimination data.

EXAMPLE 19

There is provided a print control method for a printing apparatus which has a detecting unit of characteristics information of a sheet which is conveyed to a printing unit, conveys the sheet, and outputs image information that is transferred from a data processing apparatus to the whole or a part of the surface of the sheet, comprising: a characteristics information obtaining step (step (1503) shown in FIGS. 16A and 16B) of obtaining the characteristics information of the sheet which can be detected by the detecting unit; a fitness discriminating step (steps (1504), (1512), and (1513) shown in FIGS. 16A and 16B) of discriminating whether or not the printing to the whole surface of the sheet is proper on the basis of the characteristics information obtained by the characteristics information obtaining step; an image correcting step (step (1522) shown in FIGS. 16A and 16B) of, when a whole surface print mode has been designated to the image information, correcting the image information by executing a predetermined image process to the image information transferred from the data processing apparatus on the basis of a discrimination result by the fitness discriminating step; and a control step (step (1511) shown in FIGS. 16A and 16B) of controlling so as to output the image information corrected by the image correcting step or the image information whose whole surface printing is possible to the printing unit.

EXAMPLE 20

The print control method according to Example 19, wherein in the image correcting step, if the sheet is improper for the whole surface printing, the image information is corrected by reducing the image information.

EXAMPLE 21

The print control method according to Example 19, wherein in the image correcting step, if the sheet is improper for the whole surface printing, the image information is corrected by deleting a part of the image information.

EXAMPLE 22

The print control method according to Example 19, wherein in the image correcting step, if the sheet is suitable for the whole surface printing, the image information is corrected by enlarging the image information.

EXAMPLE 23

A computer-readable storing medium which stores a program for realizing the print control method according to any one of Examples 12 to 22.

EXAMPLE 24

A program for realizing the print control method according to any one of Examples 12 to 22.

EXAMPLE 25

There is provided a data processing apparatus comprising: obtaining means for obtaining a sense result of a media; discriminating means for discriminating whether or not the media is a media which can be borderless-printed on the basis of an obtainment result by the obtaining means; and warning means for warning if it is determined by the discriminating means that the media is not the media which can be borderless-printed.

EXAMPLE 26

There is provided a data processing apparatus comprising: obtaining means for obtaining a sense result of a media; discriminating means for discriminating whether or not there is a possibility that the media is a media which cannot be borderless-printed on the basis of an obtainment result by the obtaining means; and warning means for warning if it is determined by the discriminating means that there is a possibility that the media is the media which cannot be borderless-printed.

EXAMPLE 27

There is provided a print control method comprising: an obtaining step of obtaining a sense result of a media; a discriminating step of discriminating whether or not the media is a media which can be borderless-printed on the basis of an obtainment result by the obtaining step; and a warning step of warning if it is determined by the discriminating step that the media is not the media which can be borderless-printed.

EXAMPLE 28

There is provided a print control method comprising: an obtaining step of obtaining a sense result of a media; a discriminating step of discriminating whether or not there is a possibility that the media is a media which cannot be borderless-iv printed on the basis of an obtainment result by the obtaining step; and a warning step of warning if it is determined by the discriminating step that there is a possibility that the media is the media which cannot be borderless-printed.

EXAMPLE 29

There is provided a computer-readable program comprising: an obtaining step of obtaining a sense result of a media; a discriminating step of discriminating whether or not the media is a media which can be borderless-printed on the basis of an obtainment result by the obtaining step; and a warning step of warning if it is determined by the discriminating step that the media is not the media which can be borderless-printed.

EXAMPLE 30

There is provided a computer-readable program comprising: an obtaining step of obtaining a sense result of a media; a discriminating step of discriminating whether or not there is a possibility that the media is a media which cannot be borderless-printed on the basis of an obtainment result by the obtaining step; and a warning step of warning if it is determined by the discriminating step that there is a possibility that the media is the media which cannot be borderless-printed.

According to the foregoing embodiments and Examples, since the printing system has the media sensor and the sheet specifying processing unit, the complicated sheet type setting operation becomes unnecessary and the proper print result can be provided even for the user who does not have enough knowledge of the setting of the sheet type. It is also possible to cope with the difference of the printing conditions depending on the sheet types.

When the discriminated sheet type is improper for the "borderless" printing, the "borderless" printing is blocked by reducing the image or deleting a part of the image by the image data forming unit Therefore, a risk of occurrence of an inconvenience in the printer due to the execution of the improper "borderless" printing or the wasteful ink and sheets can be avoided.

Further, since the printing is executed by the substituting method of the "borderless" printing by reducing the image or deleting a part of the image by the image data forming unit, the user can be released from the troublesome operation for reprinting.

As described above, according to the embodiments of the invention, there is provided the data processing apparatus which has the detecting unit of characteristics information of the sheet which is conveyed to the printing unit and can communicate with the printing apparatus which can convey the sheet and set the print mode for printing onto the whole or a part of the surface of the sheet, wherein when the whole surface print mode has been designated for the image information, the characteristics information of the sheet is obtained from the printing apparatus, whether or not the printing to the whole surface of the sheet is proper is discriminated on the basis of the obtained characteristics information and discrimination data which is stored, the image information which is formed is corrected by executing a predetermined image process thereto on the basis of the discrimination result, and thereafter, the corrected image information is outputted to the printing apparatus. Therefore, the type of sheet is automatically discriminated and when the user selects the print mode for executing borderless printing, if the printing to the whole surface is improper with the discriminated sheet type, the designation of the whole surface printing is automatically cancelled, and the image information is outputted with margins on the sheet, so that various faults which are caused in the printing unit when the printing to the whole surface is executed to the sheet whose whole surface printing is improper can be prevented.

There is also provided a printing apparatus which has the detecting unit of characteristics information of the sheet which is conveyed to the printing unit, conveys the sheet, and outputs the image information that is transferred from the data processing apparatus to the whole or a part of the surface of the sheet, wherein when the whole surface print mode has been designated to the image information, the characteristics information of the sheet which can be detected by the detecting unit is obtained, whether or not the printing to the whole surface of the sheet is proper is discriminated on the basis of the obtained characteristics information, the image information which is transferred from the data-processing apparatus is corrected by executing a predetermined image process thereto on the basis of the discrimination result, and control is made so as to output the corrected image information or the image information whose whole surface printing is possible to the printing unit. Therefore, the type of sheet is automatically discriminated and when the user selects the print mode for executing the borderless printing, if the printing to the whole surface is improper with the sheet type discriminated on the printing apparatus side, the designation of the whole surface printing is automatically cancelled, and the image information is outputted with margins on the sheet, so that various faults which are caused in the printing unit when the printing to the whole surfaces executed to the sheet whose whole surface printing is improper can be prevented.

A sense result of a media is obtained, whether or not the media is a media which can be borderless-printed is discriminated on the basis of the obtained result, and when it is determined that it is not the media which can be borderless-printed, such a fact is warned, or the sense result of the media is obtained, the presence or absence of a possibility of the media which cannot be borderless-printed is discriminated on the basis of the obtained result, when it is determined that there is a possibility of the media which cannot be borderless-printed, such a fact is warned, thereby timely notifying the user whether the sensed media is the media which can be borderless-printed or the media which cannot be borderless-printed, and it is possible to avoid such a situation that the printing to the media which cannot be borderless-printed is executed.

Therefore, it is possible to obtain the following excellent effects: the user who has selected the whole surface print mode can freely construct on a host or printer unit basis a print operation environment in which the proper print result can be obtained without designating the sheet type and losing the high operability and ease of use is excellent while avoiding such a situation that the printing in the whole surface print mode is executed and an inconvenience occurs in the printing unit in dependence on the type of sheet which is fed, or the like.

This application claims priority from Japanese Patent Application No. 2003-209011 filed on Aug. 27, 2003, which is hereby incorporated by reference herein.

What is claimed is:

1. An information processing apparatus for converting an image drawn based on draw information into a print command and transmitting the print command to a printer, comprising:

an accumulating unit, configured to accumulate draw information for an entire area of a recording medium if borderless printing is designated and draw information for a printable area of the recording medium if bordered printing is designated;

a determining unit, configured to determine whether the borderless printing is designated;

a discriminating unit, configured to discriminate whether the borderless printing can be executed for the recording medium based on a sense result received from the printer; and an executing unit, configured to transmit a borderless print command to the printer such that an image is printed based on the draw information for the entire area accumulated by said accumulating unit without size change, if said determining unit determines that the borderless printing is designated and if said discriminating unit discriminates that the borderless printing can be executed for the recording medium, wherein said executing unit transmits a bordered print command to the printer such that an image is printed based on the draw information for the entire area accumulated by said accumulating unit with size reduction, if said determining unit determines that the borderless printing is designated and if said discriminating unit discriminates that the borderless printing cannot be executed for the recording medium, and wherein said executing unit transmits a bordered print command to the printer such that an image is printed based on the draw information for the printable area accumulated by said accumulating unit without size change, if said determining unit determines that the borderless printing is not designated.

2. An apparatus according to claim 1, wherein said discriminating unit discriminates whether the borderless printing can be executed for the recording medium, if said determining unit determines that the borderless printing is designated.

3. An apparatus according to claim 1, wherein said executing unit transmits the bordered print command to the printer such that an image is printed by reducing the draw information for the entire area accumulated by said accumulating unit into the printable area of the recording medium, if said determining unit determines that the borderless printing is designated and if said discriminating unit discriminates that the borderless printing cannot be executed for the recording medium.

4. An apparatus according to claim 1, wherein said executing unit converts a color of the image, performs halftone processing on the color-converted image, converts the halftone-processed image into a print command and transmits the converted print command to the printer.

5. An apparatus-implemented print control method for converting an image drawn based on draw information into a print command and transmitting the print command to a printer, comprising:

an accumulating step to accumulate draw information for an entire area of a recording medium if borderless printing is designated and draw information for a printable area of the recording medium if bordered printing is designated;

a determining step to determine whether the borderless printing is designated;

a discriminating step to discriminate whether the borderless printing can be executed for the recording medium based on a sense result received from the printer; and an executing step to transmit a borderless print command to the printer such that an image is printed based on the draw information for the entire area accumulated in said accumulating step without size change, if said determining step determines that the borderless printing is designated and if said discriminating step discriminates that the borderless printing can be executed for the recording medium, wherein said executing step transmits a bordered print command to the printer such that an image is printed based on the draw information for the entire area accumulated in said accumulating step with size reduction, if said determining step determines that the borderless printing is designated and if said discriminating step discriminates that the borderless printing cannot be executed for the recording medium, and wherein said executing step transmits a bordered print command to the printer such that an image is printed based on the draw information for the printable area accumulated in said accumulating step without size change, if said determining step determines that the borderless printing is not designated.

6. A method according to claim 5, wherein said discriminating step discriminates whether the borderless printing can be executed for the recording medium, if said determining step determines that the borderless printing is designated.

7. A method according to claim 5, wherein said executing unit transmits the bordered print command to the printer such that an image is printed by reducing the draw information for the entire area accumulated in said accumulating step into the printable area of the recording medium, if said determining step determines that the borderless printing is designated and if said discriminating step discriminates that the borderless printing cannot be executed for the recording medium.

8. A method according to claim 5, wherein said executing step converts a color of the image, performs halftone processing on the color-convened image, converts the halftone-processed image into a print command and transmits the converted print command to the printer.

9. A computer-readable medium encoded with a computer program for converting an image drawn based on draw information into a print command and transmitting the print command to a printer, comprising:

an accumulating step to accumulate draw information for an entire area of a recording medium if borderless printing is designated and draw information for a printable area of the recording medium if bordered printing is designated;

a determining step to determine whether the borderless printing is designated;

a discriminating step to discriminate whether the borderless printing can be executed for the recording medium based on a sense result received from the printer; and an executing step to transmit a borderless print command to the printer such that an image is printed based on the draw information for the entire area accumulated in said accumulating step without size change, if said determining step determines that the borderless printing is designated and if said discriminating step discriminates that the borderless printing can be executed for the recording medium, wherein said executing step transmits a bordered print command to the printer such that an image is printed based on the draw information for the entire area accumulated in said accumulating step with size reduction, if said determining step determines that the borderless printing is designated and if said discriminating step discriminates that the borderless printing cannot be executed for the recording medium, and wherein said executing step transmits a bordered print command to the printer such that an image is printed based on the draw information for the printable area accumulated in said accumulating step without size change, if said determining step determines that the borderless printing is not designated.

10. A medium according to claim 9, wherein said discriminating step discriminates whether the borderless printing can be executed for the recording medium, if said determining step determines that the borderless printing is designated.

11. A medium according to claim 9, wherein said executing step transmits the bordered print command to the printer such that an image is printed by reducing the draw information for the entire area accumulated in said accumulating step into the printable area of the recording medium, if said determining step determines that the borderless printing is designated and if said discriminating step discriminates that the borderless printing cannot be executed for the recording medium.

12. A medium according to claim 9, wherein said executing step converts a color of the image, performs halftone processing on the color-convened image, converts the halftone-processed image into a print command and transmits the converted print command to the printer.

* * * * *